United States Patent
Katakura

(10) Patent No.: US 7,652,826 B2
(45) Date of Patent: Jan. 26, 2010

(54) THREE-UNIT ZOOM LENS SYSTEM AND IMAGE PICKUP APPARATUS USING THE SAME

(75) Inventor: Masahiro Katakura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/217,870

(22) Filed: Jul. 8, 2008

(65) Prior Publication Data
US 2009/0015941 A1   Jan. 15, 2009

(30) Foreign Application Priority Data

Jul. 12, 2007  (JP) .............................. 2007-183048
Aug. 3, 2007  (JP) .............................. 2007-202889

(51) Int. Cl.
*G02B 15/14* (2006.01)
(52) U.S. Cl. ...................................... 359/689; 359/680
(58) Field of Classification Search ................ 359/680, 359/686, 689; 348/240.99–240.3, 335–369; 396/72–88
See application file for complete search history.

(56) References Cited

U.S. PATENT DOCUMENTS 6,560,035 B2 *   5/2003  Enomoto .................... 359/682
6,721,107 B2 *   4/2004  Enomoto .................... 359/689
2003/0197948 A1 *  10/2003  Eguchi ...................... 359/680

FOREIGN PATENT DOCUMENTS

JP   2004-333572   11/2004
JP   2006-337793   12/2006

* cited by examiner

*Primary Examiner*—Darryl J Collins
(74) *Attorney, Agent, or Firm*—Kenyon & Kenyon LLP

(57) ABSTRACT

A three-unit zoom lens system includes in order from an object side thereof a first lens unit G1 having a negative refracting power, a second lens unit G2 having a positive refracting power, a third lens unit G3 having a negative refracting power, and an aperture stop which is at an image side of the first lens unit G1, and at the object side of a lens surface nearest to the image side of the second lens unit G2, and which moves integrally with the second lens unit. At a time of zooming from a wide angle end to a telephoto end, a distance between the first lens unit G1 and the second lens unit G2 is narrowed, and a distance between the second lens unit G2 and the third lens unit G3 changes. The second lens unit G2 moves toward the object side at the time of zooming from the wide angle end to the telephoto end. The third lens unit G3 moves to be positioned at the object side at the telephoto end, with respect to the wide angle end. The three-unit zoom lens system satisfies predetermined conditional expressions.

23 Claims, 15 Drawing Sheets

THREE-UNIT ZOOM LENS SYSTEM AND IMAGE PICKUP APPARATUS USING THE SAME

CROSS-REFERENCE TO RELATED APPLICATION

The present application is based upon and claims the benefit of priority from the prior Japanese Patent Application Nos. 2007-183048 filed on Jul. 12, 2007, and 2007-202889 filed on Aug. 3, 2007; the entire contents of which are incorporated herein by reference.

BACKGROUND OF THE INVENTION

1. Field of the Invention

The present invention relates to a three-unit zoom lens system of a small size, and an image pickup apparatus such as a compact digital camera in which the three-unit zoom lens system is used.

2. Description of the Related Art

In an image pickup apparatus such as a digital camera and a video camera, a high image quality, a high magnification, and a thinning of a lens frame have been sought. For example, a zoom lens system which includes a first lens unit having a negative refracting power, a second lens unit having a positive refracting power, and a third lens unit having a negative refracting power as described in Japanese Patent Application Laid-open Publication No. 2004-333572 has hitherto been known. This zoom lens system has a comparatively favorable optical performance, while securing a high magnification ratio of about 4.

Moreover, recently, an image pickup element which picks up a favorable image even when an angle of incidence of light rays incident on a portion around an image pickup area of an image pickup element is made large as described in Japanese Patent Application Laid-open Publication No. 2006-351972 has been known.

SUMMARY OF THE INVENTION

According to a first aspect of the present invention, there is provided a three-unit zoom lens system including in order from an object side thereof a first lens unit having a negative refracting power, a second lens unit having a positive refracting power, a third lens unit having a negative refracting power, and an aperture stop which is at an image side of the first lens unit, and at the object side of a lens surface nearest to the image side of the second lens unit, and at a time of zooming from a wide angle end to a telephoto end, a distance between the first lens unit and the second lens unit is narrowed, and a distance between the second lens unit and the third lens unit changes, and the second lens unit moves toward the object side at the time of zooming from the wide angle end to the telephoto end, and the third lens unit moves to be positioned at the object side at the telephoto end, with respect to the wide angle end, and the three-lens zoom lens system satisfies the following conditional expressions.

$$f_t/f_w > 3.8 \tag{1}$$

$$d_{G3}/f_w < 1.0 \tag{2}$$

where, $f_w$ denotes a focal length at the wide angle end, of the three-unit zoom lens system, $f_t$ denotes a focal length at the telephoto end, of the three-unit zoom lens system, and $d_{G3}$ denotes an optical axial thickness of the third lens unit.

According to a second aspect of the present invention, there is provided a three-unit zoom lens system including in order from an object side thereof a first lens unit having a negative refracting power, a second lens unit having a positive refracting power, a third lens unit having a negative refracting power, and an aperture stop which is at an image side of the first lens unit, and at the object side of a lens surface nearest to the image side of the second lens unit, and which moves integrally with the second lens unit, and at the time of zooming from a wide angle end to a telephoto end, a distance between the first lens unit and a second lens unit is narrowed, and a distance between the second lens unit and the third lens unit changes, and the second lens unit moves toward the object side at the time of zooming from the wide angle end to the telephoto end, and the third lens unit moves to be positioned at the object side at the telephoto end, with respect to the wide angle end, and the three-unit zoom lens system satisfies the following conditional expressions $$3.8 < f_t/f_w < 5.5 \tag{21}$$

$$2.0 < \beta_2(t)/\beta_2(w) < 3.2 \tag{22}$$

$$1.2 < \beta_3(t)/\beta_3(w) < 1.8 \tag{23}$$

where, $f_t$ denotes a focal length at the wide angle end, of the three-unit zoom lens system, $f_w$ denotes a focal length at the telephoto end, of the three-unit zoom lens system, $\beta_2$ (w) denotes a lateral magnification of the second lens unit, at the wide angle end, $\beta_2$ (t) denotes a lateral magnification of the second lens unit, at the telephoto end, $\beta_3$ (w) denotes a lateral magnification of the third lens unit, at the wide angle end, and $\beta_3$ (t) denotes a lateral magnification of the third lens unit, at the telephoto end.

Moreover, it is possible to form an image pickup apparatus by combining the three-unit zoom lens system according to the present invention, and an image pickup element which converts an optical image formed by the three-unit zoom lens system, to an electric signal.

BRIEF DESCRIPTION OF THE DRAWINGS

FIG. 1A shows a state at a wide angle end, FIG. 1B shows an intermediate state, and FIG. 1C shows a state at a telephoto end;

FIG. 6A shows a state at the wide angle end, FIG. 6B shows an intermediate state, and FIG. 6C shows a state at the telephoto end;

DETAILED DESCRIPTION OF THE INVENTION

Figure 1A:
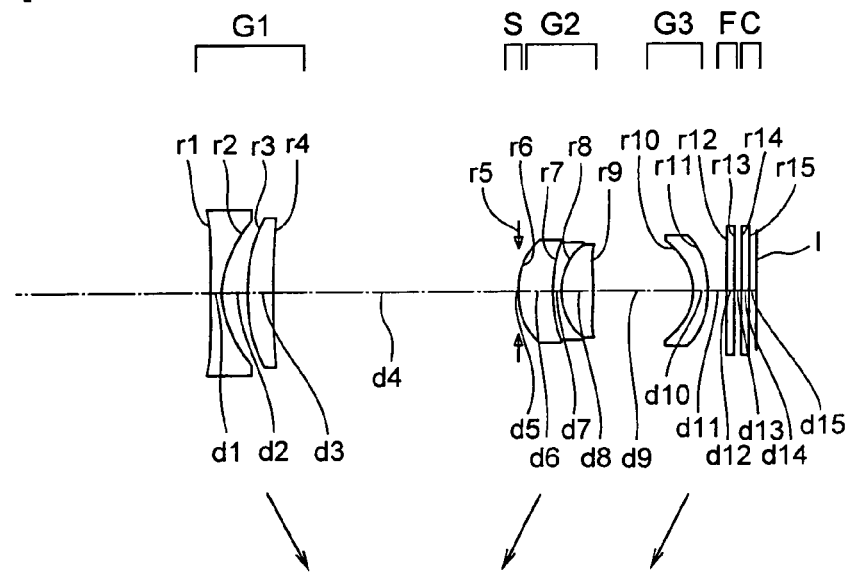
FIG. 1A, FIG. 1B, and FIG. 1C are lens cross-sectional views along an optical axis showing an optical arrangement at the time of infinite object point focusing of a first embodiment of a zoom lens system according to the present invention, where.

A three-unit zoom lens system of a first type (according to a first aspect) of to the present invention will be described below.

In the present invention, the three-unit zoom lens system has a basic structure which includes in order from an object side thereof, a first lens unit having a negative refracting power, a second lens unit having a positive refracting power, and a third lens unit having a negative refracting power, and at the time of zooming from a wide angle end to a telephoto end, a distance between the first lens unit and the second lens unit is narrowed, and a distance between the second lens unit and the third lens unit changes, and the second lens unit moves toward the object side at the time of zooming from the wide angle end to the telephoto end, and the third lens unit moves to be positioned at the object side at the telephoto end, with respect to the wide angle end.

In this manner, by letting the refracting power of the first lens unit to be negative, it is advantageous for securing an image angle, making a size small in a radial direction, and reducing the number of lens units forming the zoom lens system. A decrease in the number of lens units is also advantageous for decreasing the number of lenses. As a result, this leads to a thinning of a lens frame and a reduction in cost.

Moreover, by the second lens unit having a positive refracting power changing the distance with the first lens unit, the second lens unit functions as a variator, and a magnification is increased by moving from the object side to the image side at the time of zooming from the wide angle end to the telephoto end.

Moreover, by imparting a negative refracting power to the third lens unit, an effect of increase in the magnification is achieved by moving the third lens unit to the object side at the telephoto end, with respect to the wide angle end.

By increasing the magnification at the time of zooming from the wide angle end to the telephoto end, in the two lens units namely the second lens unit and the third lens unit, it is possible to divide an effect of the increase in magnification by each lens unit by a small amount of movement. As a result, it is possible to make small an overall length of the zoom lens system, with an image quality maintained to be favorable.

Since the third lens unit which is the last lens unit, has a negative refracting power, a symmetry of a power distribution of the overall zoom lens system becomes favorable, and it is balanced with a negative refracting power of the first lens unit. Therefore, it is possible to provide a zoom lens system in which, a longitudinal aberration and an oblique aberration are balanced, without causing to occur a distortion and an image plane curvature more than necessary.

The three-unit zoom lens system according to the present invention further includes an aperture stop which is at an image side of the first lens unit, and at the object side of a lens surface nearest to the image side of the second lens unit, and which moves integrally with the second lens unit.

By making an arrangement in such manner, it is possible to suppress a height of off-axis rays which are incident on the first lens unit, and to make small a size of the first lens unit in the radial direction. Moreover, it is possible to make small a size in the radial direction, of the second lens unit, and it is advantageous for size reduction and securing a positive refracting power of the second lens unit. Moreover, it is possible to prevent an exit pupil from being too close to an image pickup element. Moreover, by the aperture stop moving integrally with the second lens unit, it is possible to make simple a drive mechanism, and it is advantageous for simplification of a structure.

Moreover, the three-unit zoom lens system according to the present invention is let to have an arrangement which satisfies the following conditional expressions.

$$f_t/f_w > 3.8 \quad (1)$$

$$d_{G3}/f_w < 1.0 \quad (2)$$

where, $f_w$ denotes a focal length at the wide angle end, of the three-unit zoom lens system, $f_t$ denotes a focal length at the telephoto end, of the three-unit zoom lens system, and $d_{G3}$ denotes an optical axial thickness of the third lens unit.

Conditional expression (1) is an expression which specifies a zooming ratio, and it is preferable to secure the zooming ratio by making an arrangement such that a value is not lower than a lower limit value in conditional expression (1).

Conditional expression (2) is an expression which specifies an optical axial thickness of the third lens unit. It is preferable to carry out thinning of the third lens unit by making an arrangement such that a value is not higher than an upper limit value in conditional expression (2).

Furthermore, it is preferable to make an arrangement such that the three-unit zoom lens system satisfies any of the following conditional expressions.

$$3 < D_w/f_w < 8 \quad (3)$$

$$0.3 < D_t/f_t < 1.8 \quad (4)$$

where, $D_w$ denotes an overall optical axial length at the wide angle end, of the three-unit zoom lens system, $D_t$ denotes an overall optical axial length at the telephoto end, of the three-unit zoom lens system, and the overall length is a length which is obtained by adding a back focus expressed in terms of an air conversion length, to an optical axial thickness from a surface of incidence of a lens nearest to the object up to a surface of emergence of a lens nearest to the image, of the three-unit zoom lens system.

Conditional expressions (3) and (4) are expressions which specify a preferable overall length of the three-unit zoom lens system. By making an arrangement such that a value is not higher than an upper limit value in conditional expressions (3) and (4), it is advantageous for thinning at the time of use. Moreover, by making an arrangement such that a value is not lower than a lower limit value in conditional expressions (3) and (4), it becomes easy to suppress the refracting power of each lens unit, and to reduce the longitudinal aberration and the oblique aberration.

Moreover, it is preferable that at the time of zooming from the wide angle end to the telephoto end, the second lens unit and the third lens unit satisfy the following conditional expressions.

$$0.3 < \Delta G_3 / \Delta G_2 < 1.2 \quad (5)$$

where, $\Delta G_2$ denotes an amount of change in a position at the telephoto end with respect to a position at the wide angle end of the second lens unit, $\Delta G_3$ denotes an amount of change in a position at the telephoto end with respect to a position at the wide angle end of the third lens unit, and a change at the object side is let to be a positive reference numeral.

Conditional expression (5) is an expression in which, a preferable ratio of an amount of movement of the second lens unit and the third lens unit is indicated. By making an arrangement such that a value is not higher than an upper limit value in conditional expression (5), and a value is not lower than a lower limit value in conditional expression (5), a deviation in the amount of movement at the time of zooming of the second lens unit and the third lens unit is reduced, and it is advantageous for making small the zoom lens system.

Moreover, it is preferable that the first lens unit has a negative lens nearest to the object, which satisfies the following conditional expression.

$$0.0 < (r_{L11} + r_{L12})/(r_{L11} - r_{L12}) < 3.0 \quad (6)$$

where, $r_{L11}$ denotes a paraxial radius of curvature of a surface on the object side, of the negative lens nearest to the object, in the first lens unit, and $r_{L12}$ denotes a paraxial radius of curvature of a surface on the image side, of the negative lens nearest to the object, in the first lens unit.

Conditional expression (6) is an expression related to a shape of a lens nearest to the object, in the first lens unit of the three-unit zoom lens system. By making an arrangement such that a value is not lower than a lower limit value in conditional expression (6), it becomes easy to suppress a curvature of a lens surface nearest to the object, in the first lens unit, and to suppress the oblique aberration.

Moreover, by making an arrangement such that a value is not higher than an upper limit value in conditional expression (6), it is possible to prevent the negative lens from being excessively close to the object with respect to a principal point of the negative lens, and it is advantageous for making the size small.

Moreover, it is preferable that when the total number of lenses in the three-unit zoom lens system is denoted by N, the three-unit zoom lens system satisfies the following conditional expression.

$$5 \leq N \leq 8 \quad (7)$$

By making an arrangement such that a value is not higher than an upper limit value in conditional expression (7), it is advantageous for a cost reduction, and making the size small when a lens barrel is collapsed.

By making arrangement such that a value is not lower than a lower limit value in conditional expression (7), it becomes easy to have both an optical performance and securing of the zooming ratio.

Moreover, it is preferable that the second lens unit includes a cemented lens of a positive lens and a negative lens, and an Abbe's number of the negative lens in the second lens unit is smaller than an Abbe's number of the positive lens in the second lens unit.

For correcting a longitudinal chromatic aberration which is susceptible to occur at the telephoto end, it is preferable to let the abovementioned arrangement, and to impart an achromatism to the second lens unit.

Moreover, in the three-unit zoom lens system according to the present invention, it is preferable that the total number of lenses in the third lens unit is one. By structuring the third lens unit by one lens, it is possible to reduce a thickness when the lens barrel is collapsed, and it is possible to suppress the cost.

Moreover, in the three-unit zoom lens system according to the present invention, it is preferable that both surfaces namely a lens surface nearest to the object and a lens surface nearest to the image in the second lens unit are aspheric surfaces.

By making the lens surface nearest to the object and the lens surface nearest to the image in the second lens unit aspheric surfaces, it is advantageous for correcting favorably a spherical aberration in all states from the wide angle end up to the telephoto end.

Moreover, it is possible to use any of the abovementioned three-unit zoom lens systems as an image forming lens of an image pickup apparatus. In other words, it is preferable that the image pickup apparatus is let to be an image pickup apparatus which includes a three-unit zoom lens system, and an image pickup element which is disposed at an image side of the three-unit zoom lens system, and which converts an optical image formed by the three-unit zoom lens system, to an electric signal, and the three-unit zoom lens system is any of the abovementioned three-unit zoom lens systems. Accordingly, it is advantageous for making small a size of an apparatus.

Furthermore, it is preferable that the image pickup apparatus includes an image conversion section which converts the electric signal including a distortion due to the three-unit zoom lens system, to an image signal in which, the distortion is corrected by an image processing. By allowing the distortion of the three-unit zoom lens system, it is advantageous for reducing the number of lenses and making small the size of the three-unit zoom lens system.

Moreover, in the image pickup apparatus according to the present invention, it is preferable that in a state at the wide angle end of the three-unit zoom lens system, an angle formed by an optical axis and a chief ray which is emerged from the three-unit zoom lens system directed toward a maximum image height of an effective image pickup area of the image pickup element satisfies the following conditional expression.

$$-40° < EX(w) < -11°  \quad (8)$$

where,

EX(w) denotes the angle formed by the optical axis and the chief ray which is emerged from the three-unit zoom lens system directed toward the maximum image height of the effective image pickup area of the image pickup element.

By using the image pickup element which allows a size of an angle of emergence, which satisfies conditional expression (8), it is possible to impart a strong negative refracting power to the third lens unit.

By making an arrangement such that a value is not higher than an upper limit value in conditional expression (8), it becomes easy to impart sufficient negative refracting power to the third lens unit, and it is advantageous for reducing the overall length of the three-unit zoom lens system, and improving the optical performance. Therefore, it is convenient.

Moreover, by making an arrangement such that a value is not lower than a lower limit value in conditional expression (8), the angle of emergence is suppressed from becoming excessively large, and it is advantageous for securing oblique incident light. Therefore, it is preferable.

Each of the abovementioned conditional expressions is let to be an arrangement in a state of being focused at the longest possible distance, when the three-unit zoom lens system has a focusing function.

It is preferable to carry out focusing by moving the third lens unit, as it is easy to reduce a load of drive. As a matter of course, it may be a focusing method in which the entire zoom lens system is drawn out, or a focusing method in which the first lens unit is drawn out.

It is preferable in conditional expression (1) to provide an upper limit value, and make an arrangement such that a value is not higher than 8.0, and more preferable that the value is not higher than 5.5.

It is preferable to provide a lower limit value in conditional expression (2), and make an arrangement such that the value is not lower than 0.05, and it is more preferable that the value is not lower than 0.1.

Accordingly, it becomes easy to maintain strength of the lens.

It is preferable to let an upper limit value to be 0.5, and an upper limit value of 0.3 is more preferable.

It is preferable to let a lower limit value in conditional expression (3) to be 4, and a lower limit value of 5 is more preferable.

It is preferable to let an upper limit value in conditional expression (3) to be 7, and an upper limit value of 6.5 is more preferable.

It is preferable to let a lower limit value in conditional expression (4) to be 0.6, and a lower limit value of 1.0 is more preferable.

It is preferable to let an upper limit value in conditional expression (4) to be 1.7, and an upper limit value of 1.6 is more preferable.

It is preferable to let a lower limit value in conditional expression (5) to be 0.6, and a lower limit value of 0.9 is more preferable.

It is preferable to let an upper limit value in conditional expression (5) to be 1.1, and an upper limit value of 1.05 is more preferable.

It is preferable to let a lower limit value in conditional expression (6) to be 0.3, and a lower limit value of 0.5 is more preferable.

It is preferable to let an upper limit value in conditional expression (6) to be 1.5, and an upper limit value of 1.0 is more preferable.

It is preferable to let a lower limit value in conditional expression (8) to be −30.0°, and a lower limit value of −25.0° is more preferable.

It is preferable to let an upper limit value in conditional expression (8) to be −12.0°, and an upper limit value of −15.0° is more preferable.

Next, a three-unit zoom lens system according to a second aspect of the present invention will be described below.

In the present invention, the three-unit zoom lens system has a basic structure which includes in order from an object side thereof, a first lens unit having a negative refracting power, a second lens unit having a positive refracting power, and a third lens unit having a negative refracting power, and at the time of zooming from a wide angle end to a telephoto end, a distance between the first lens unit and the second lens unit is narrowed, and a distance between the second lens unit and the third lens unit changes, and the second lens unit moves toward the object side at the time of zooming from the wide angle end to the telephoto end, and the third lens unit moves to be positioned at the object side at the telephoto end, with respect to the wide angle end.

In this manner, by letting the refracting power of the first lens unit to be negative, it is advantageous for securing an image angle, making a size small in a radial direction, and reducing the number of lens units forming the zoom lens system.

A decrease in the number of lens units is also advantageous for decreasing the number of lenses. As a result, this leads to a thinning of a lens frame and a reduction in cost.

Moreover, by the second lens unit having a positive refracting power changing the distance with the first lens unit, the second lens unit functions as a variator, and a magnification is increased by moving from the object side to the image side at the time of zooming from the wide angle end to the telephoto end.

Moreover, by imparting a negative refracting power to the third lens unit, an effect of increase in the magnification is achieved by moving the third lens unit to the object side at the telephoto end, with respect to the wide angle end.

By increasing the magnification at the time of zooming from the wide angle end to the telephoto end, in the two lens units namely the second lens unit and the third lens unit, it is possible to divide an effect of the increase in magnification by each lens unit by a small amount of movement, and as a result, it is possible to make small an overall length of the zoom lens system, with an image quality maintained to be favorable.

Since the third lens unit which is the last lens unit, has a negative refracting power, a symmetry of a power distribution of the overall zoom lens system becomes favorable. Therefore, and it is balanced with a negative refracting power of the first lens unit. Consequently, an aberration such as a distortion and an image plane curvature more than necessary is not generated. As a result, it is possible to provide a zoom lens system in which, a longitudinal aberration and an oblique aberration are balanced.

The three-unit zoom lens system according to the present invention further includes an aperture stop which is at an image side of the first lens unit, and at the object side of a lens surface nearest to the image side of the second lens unit, and which moves integrally with the second lens unit.

By making an arrangement in such manner, it is possible to suppress a height of off-axis rays which are incident on the first lens unit, and to make small a size of the first lens unit in the radial direction. Moreover, it is possible to make small a size in the radial direction, of the second lens unit, and it is advantageous for size reduction and securing a positive refracting power of the second lens unit. Moreover, it is possible to prevent an exit pupil from being too close to an image pickup element. Moreover, by the aperture stop moving integrally with the second lens unit, it is possible to make simple a drive mechanism, and it is advantageous for simplification of a structure.

Moreover, the three-unit zoom lens system according to the present invention is let to have an arrangement which satisfies the following conditional expressions.

$$3.8 < f_t/f_w < 5.5 \tag{21}$$

$$2.0 < \beta_2(t)/\beta_2(w) < 3.2 \tag{22}$$

$$1.2 < \beta_3(t)/\beta_3(w) < 1.8 \tag{23}$$

where, $f_t$ denotes a focal length at the wide angle end, of the three-unit zoom lens system, $f_w$ denotes a focal length at the telephoto end, of the three-unit zoom lens system, $\beta_2$ (w) denotes a lateral magnification of the second lens unit, at the wide angle end, $\beta_2$ (t) denotes a lateral magnification of the second lens unit, at the telephoto end, $\beta_3$ (w) denotes a lateral magnification of the third lens unit, at the wide angle end, and $\beta_3$ (t) denotes a lateral magnification of the third lens unit, at the telephoto end.

Conditional expression (21) is an expression which specifies a zooming ratio, and it is preferable to secure the zooming ratio by making an arrangement such that a value is not lower than a lower limit value in conditional expression (21). Moreover, by making an arrangement such that a value is not higher than an upper limit value in conditional expression (21), it is advantageous for suppressing a magnification load of the second lens unit and the third lens unit, and the overall length becomes short.

Conditional expression (22) is an expression which specifies a magnification load from the wide angle end to the telephoto end of the second lens unit, and conditional expression (23) is an expression which specifies a magnification load of the third lens unit.

By imparting the magnification load not only to the second lens unit but also to the third lens unit, it is possible to prevent the magnification load of the second lens unit from being extremely substantial, and to prevent an amount of movement and an aberration fluctuation at the time of magnification.

By making an arrangement such that a value is not lower than a lower limit value in conditional expression (22), it becomes easy to prevent an increase in the overall length and the aberration fluctuation due to excessive increase in the magnification load of the third lens unit.

By making an arrangement such that a value is not higher than a higher limit value in conditional expression (22), it is advantageous for suppressing the magnification load of the second lens unit, and shortening the overall length.

By making an arrangement such that a value is not lower than a lower limit value in conditional expression (23), it becomes easy to reduce the magnification load on the second lens unit, and to prevent an increase in the overall length and the aberration fluctuation at the time of zooming.

By making an arrangement such that a value is not higher than an upper limit value in conditional expression (23), it becomes easy to suppress the magnification load of the third lens unit, and to suppress the amount of movement of the third lens unit.

Furthermore, it is preferable that the three-unit zoom lens system according to the present invention satisfies one of the following arrangements.

In the three-unit zoom lens system according to the present invention, it is preferable that the third lens unit includes a negative lens component having a shape of a meniscus, which satisfies the following conditional expression.

$$-20 < (r_{L31} + r_{L32})/(r_{L31} - r_{L32}) < -1.0 \tag{24}$$

where, $r_{L31}$ denotes a paraxial radius of curvature of a surface on the object side, of the negative lens element in the third lens unit, and $r_{L32}$ denotes a paraxial radius of curvature of a surface on the image side, of the negative lens element in the third lens unit, and a lens component is a lens having only two surfaces namely a surface of incidence and a surface of emergence which make a contact with air in an area through which the light passes, and means a single lens or a cemented lens.

Conditional expression (24) is an expression which specifies a preferable shape of the negative lens component in the third lens unit. By satisfying conditional expression (24), it is advantageous for securing the off-axis optical performance particularly at the wide angle end.

By making an arrangement such that a value is not lower than a lower limit value in conditional expression (24), it becomes easy to suppress a curvature of a surface of incidence and a surface of emergence of the negative lens component, and to suppress an occurrence of an aberration.

By making an arrangement such that a value is not higher than a higher limit value in conditional expression (24), it becomes easy to make small an angle of incidence of light rays which are incident on the negative lens, and it is advantageous for suppressing mainly oblique aberration.

Moreover, it is preferable that the three-unit zoom lens system according to the present invention satisfies the following conditional expression.

$$3 < D_w/f_w < 8 \tag{25}$$

$$0.3 < D_t/f_t < 1.8 \tag{26}$$

where, $D_w$ denotes an overall optical axial length at the wide angle end, of the three-unit zoom lens system, $D_t$ denotes an overall optical axial length at the telephoto end, of the three-unit zoom lens system, and the overall length is a length which is obtained by adding a back focus expressed in terms of an air conversion length, to an optical axial thickness from a surface of incidence of a lens nearest to the object up to a surface of emergence of a lens nearest to the image, of the three-unit zoom lens system.

Conditional expressions (25) and (26) are expressions which specify a preferable overall length of the three-unit zoom lens system. By making an arrangement such that a value is not higher than an upper limit value in conditional expressions (25) and (26), it is advantageous for thinning at the time of use. Moreover, by making an arrangement such that a value is not lower than a lower limit value in conditional expressions (25) and (26), it becomes easy to suppress the refracting power of each lens unit, and to reduce the longitudinal aberration and the oblique aberration.

Moreover, it is preferable that at the time of zooming from the wide angle end to the telephoto end, the second lens unit and the third lens unit satisfy the following conditional expressions.

$$0.3 < \Delta G_3 / \Delta G_2 < 1.2 \quad (27)$$

where, $\Delta G_2$ denotes an amount of change in a position at the telephoto end with respect to a position at the wide angle end of the second lens unit, $\Delta G_3$ denotes an amount of change in a position at the telephoto end with respect to a position at the wide angle end of the third lens unit, and a change at the object side is let to be a positive reference numeral.

Conditional expression (27) is an expression in which, a preferable ratio of an amount of movement of the second lens unit and the third lens unit is indicated. By making an arrangement such that a value is not higher than an upper limit value in conditional expression (27), and a value is not lower than a lower limit value in conditional expression (27), a deviation in the amount of movement at the time of zooming of the second lens unit and the third lens unit is reduced, and it is advantageous for making small the zoom lens system.

Moreover, it is preferable that the first lens unit has a negative lens nearest to the object, which satisfies the following conditional expression.

$$0.0 < (r_{L11} + r_{L12})/(r_{L11} - r_{L12}) < 3.0 \quad (28)$$

where, $r_{L11}$ denotes a paraxial radius of curvature of a surface on the object side, of the negative lens nearest to the object, in the first lens unit, and $r_{L12}$ denotes a paraxial radius of curvature of a surface on the image side, of the negative lens nearest to the object, in the first lens unit.

Conditional expression (28) is an expression related to a shape of a lens nearest to the object, in the first lens unit of the three-unit zoom lens system. By making an arrangement such that a value is not lower than a lower limit value in conditional expression (28), it becomes easy to suppress a curvature of a lens surface nearest to the object, in the first lens unit, and to suppress the oblique aberration.

Moreover, by making an arrangement such that a value is not higher than an upper limit value in conditional expression (28), it is possible to prevent the negative lens from being excessively close to the object with respect to a principal point of the negative lens, and it is advantageous for making the size small.

Moreover, it is preferable that when the total number of lenses in the three-unit zoom lens system is denoted by N, the three-unit zoom lens system satisfies the following conditional expression.

$$5 \leq N \leq 8 \quad (29).$$

By making an arrangement such that a value is not higher than an upper limit value in conditional expression (29), it is advantageous for cost reduction, and making the size small when a lens barrel is collapsed.

By making an arrangement such that a value is not lower than a lower limit value in conditional expression (29), it becomes easy to have both an optical performance and securing of the zooming ratio.

Moreover, it is preferable that the second lens unit includes a cemented lens of a positive lens and a negative lens, and an Abbe's number of the negative lens in the second lens unit is smaller than an Abbe's number of the positive lens in the second lens unit. For correcting a longitudinal chromatic aberration which is susceptible to occur at the telephoto end, it is preferable to let the abovementioned arrangement, and to impart an achromatism to the second lens unit.

Moreover, in the three-unit zoom lens system according to the present invention, it is preferable that the total number of lenses in the third lens unit is one. By structuring the third lens unit by one lens, it is possible to reduce a thickness when the lens barrel is collapsed, and it is possible to suppress the cost.

Moreover, in the three-unit zoom lens system according to the present invention, it is preferable that both surfaces namely a lens surface nearest to the object and a lens surface nearest to the image in the second lens unit are aspheric surfaces. By making the lens surface nearest to the object and the lens surface nearest to the image in the second lens unit aspheric surfaces, it is advantageous for correcting favorably a spherical aberration in all states from the wide angle end up to the telephoto end.

Moreover, it is possible to use any of the abovementioned three-unit zoom lens systems as an image forming lens of an image pickup apparatus. In other words, it is preferable that the image pickup apparatus is let to be an image pickup apparatus which includes a three-unit zoom lens system, and an image pickup element which is disposed at an image side of the three-unit zoom lens system, and which converts an optical image formed by the three-unit zoom lens system, to an electric signal, and the three-unit zoom lens system is any of the abovementioned three-unit zoom lens systems. Accordingly, it is advantageous for making small a size of an apparatus.

Furthermore, it is preferable that the image pickup apparatus includes an image conversion section which converts the electric signal including a distortion due to the three-unit zoom lens system, to an image signal in which, the distortion is corrected by an image processing. By allowing the distortion of the three-unit zoom lens system, it is advantageous for reducing the number of lenses and making small the size of the three-unit zoom lens system.

Moreover, in the image pickup apparatus according to the present invention, it is preferable that in a state at the wide angle end of the three-unit zoom lens system, an angle formed by an optical axis and a chief ray which is emerged from the three-unit zoom lens system directed toward a maximum image height of an effective image pickup area of the image pickup element satisfies the following conditional expression.

$$-40° < EX(w) < -11° \quad (30)$$

where,

EX(w) denotes the angle formed by the optical axis and the chief ray which is emerged from the three-unit zoom lens system directed toward the maximum image height of the effective image pickup area of the image pickup element.

By using the image pickup element which allows a size of an angle of emergence which satisfies conditional expression (30), it is possible to impart a strong negative refracting power to the third lens unit.

By making an arrangement such that a value is not higher than an upper limit value in conditional expression (30), it becomes easy to impart sufficient negative refracting power to the third lens unit, and it is advantageous for reducing the overall length of the three-unit zoom lens system, and improving the optical performance. Therefore, it is convenient.

Moreover, by making an arrangement such that a value is not lower than a lower limit value in conditional expression (30), the angle of emergence is suppressed from becoming excessively large, and it is advantageous for securing oblique incident light. Therefore, it is preferable.

Each of the abovementioned conditional expressions is let to be arranged in a state of being focused at the longest possible distance, when the three-unit zoom lens system has a focusing function.

It is preferable to carry out focusing by moving the third lens unit, as it is easy to reduce a load of drive. As a matter of course, it may be a focusing method in which the entire zoom lens system is drawn out, or a focusing method in which the first lens unit is drawn out.

It is preferable to let a lower limit value in conditional expression (22) to be 2.1, and a lower limit value of 2.2 is more preferable.

It is preferable to let an upper limit value in conditional expression (22) to be 3.0, and an upper limit value of 2.8 is more preferable.

It is preferable to let a lower limit value in conditional expression (23) to be 1.25, and a lower limit value of 1.3 is more preferable.

It is preferable to let an upper limit value in conditional expression (23) to be 1.75, and an upper limit value of 1.8 is more preferable.

It is preferable to let a lower limit value in conditional expression (24) to be −10, and a lower limit value of −6 is more preferable.

It is preferable to let an upper limit value in conditional expression (24) to be −2.0, and an upper limit value of −3.0 is more preferable.

It is preferable to let a lower limit value in conditional expression (25) to be 4, and a lower limit value of 5 is more preferable.

It is preferable to let an upper limit value in conditional expression (25) to be 7, and an upper limit value of 6.5 is more preferable.

It is preferable to let a lower limit value in conditional expression (26) to be 0.6, and a lower limit value of 1.0 is more preferable.

It is preferable to let an upper limit value in conditional expression (26) to be 1.7, and an upper limit value of 1.6 is more preferable.

It is preferable to let a lower limit value in conditional expression (27) to be 0.6, and a lower limit value of 0.9 is more preferable.

It is preferable to let an upper limit value in conditional expression (27) to be 1.1, and an upper limit value of 1.05 is more preferable.

It is preferable to let a lower limit value in conditional expression (28) to be 0.3, and a lower limit value of 0.5 is more preferable.

It is preferable to let an upper limit value in conditional expression (28) to be 1.5, and an upper limit value of 1.0 is more preferable.

It is preferable to let a lower limit value in conditional expression (30) to be −30.0°, and a lower limit value of −25.0° is more preferable.

It is preferable to let an upper limit value in conditional expression (30) to be −12.0°, and an upper limit value of −15.0° is more preferable.

It is preferable that each invention described above satisfies arbitrarily a plurality of conditional expressions simultaneously. Moreover, regarding each conditional expression, only an upper limit value and a lower limit value in a range of numerical values of the more restricted conditional expression may be restricted. Moreover, various structures described above may be combined arbitrarily.

Exemplary embodiments of the three-unit zoom lens system and the image pickup apparatus according to the present invention will be described below in detail by referring to the accompanying diagrams. However, the present invention is not restricted to the embodiments described below.

Each of the embodiments described below is a three-unit zoom lens system of a negative, positive and negative refracting power type, having a favorable optical performance in which, a high zooming ratio of about 4 is achieved, and a half image angle at a wide angle end of 38° and more is secured. Moreover, it is a zoom lens system in which, near the wide angle end, at the third lens unit having a negative refracting power, off-axis light beam is made to be refracted in a direction away from an optical axis, and a size in a radial direction and an optical axial direction is small.

In the embodiments from a first embodiment to a fifth embodiment, an effective image pickup area in a full-zoom state is rectangular and constant.

The embodiments from the first embodiment to the fifth embodiment of the three-unit zoom lens system according to the present invention will be described below. Lens cross-sectional views at the wide angle end (FIG. 1A, FIG. 2A, FIG. 3A, FIG. 4A, and FIG. 5A), at the intermediate focal length state (FIG. 2A, FIG. 2B, FIG. 3B, FIG. 4B, and FIG. 5B), and at the telephoto end (FIG. 1C, FIG. 2C, FIG. 3C, FIG. 4C, and FIG. 5C) at the time of infinite object point focusing of the embodiments from the first embodiment to the fifth embodiment are shown in FIG. 1A to FIG. 5C. In FIG. 1A to FIG. 5C, G1 denotes a first lens unit, G2 denotes a second lens unit, S denotes an aperture stop, G3 denotes a third lens unit, F denotes a parallel flat plate which forms a low pass filter in which, a wavelength region restricting coating which restricts infrared light is applied, C denotes a parallel flat plate of carbon glass of an electronic image pickup element, and I denotes an image plane. A multilayered film for restricting a wavelength region may be applied to a surface of the carbon glass C. Moreover, the carbon glass C may be let to have an effect of a low pass filter.

Moreover, in each embodiment, the aperture stop S moves integrally with the second lens unit G2. And each numerical data is data in a state of being focused (when focused) at an object at an infinite distance. A unit of length for each value is mm, and a unit of angle is degree (°). Focusing in each embodiment is carried out by moving a lens unit nearest to the image. In other words, the focusing is carried out by moving the third lens unit G3, and the focusing operation from a long-distance object point to a short-distance object point is carried out by moving the third lens unit G3 toward the image. Further, zoom data is values at the wide angle end (WE), the intermediate focal length state (ST), and the telephoto end (TE).

Figure 1B:
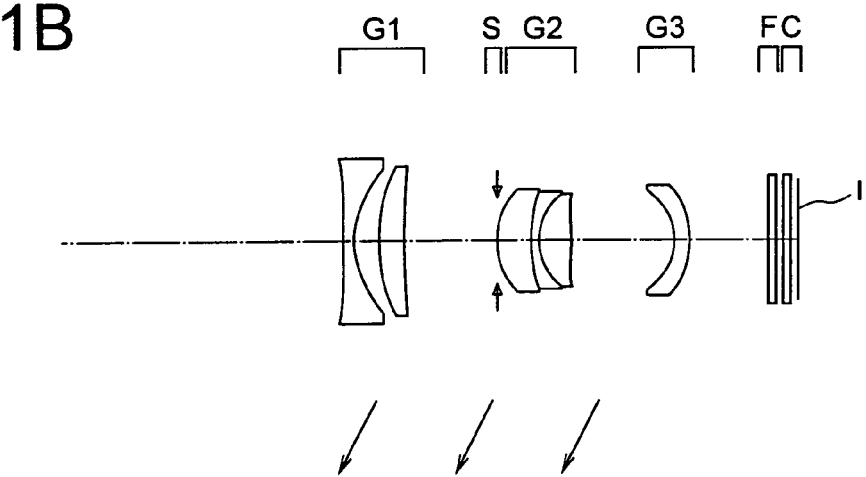
Figure 1C:
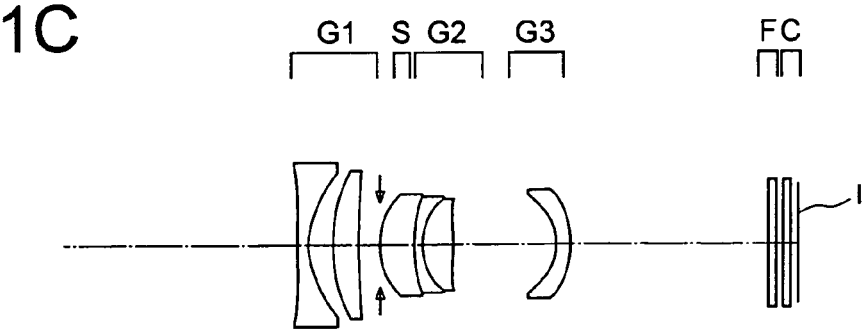

A zoom lens system in the first embodiment, as shown in FIG. 1A, FIG. 1B, and FIG. 1C, includes in order from an object side thereof, a first lens unit G1 having a negative refracting power, an aperture stop S, a second lens unit G2 having a positive refracting power, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3 moves only toward the object side.

In order from the object side, the first lens unit G1 includes a biconcave negative lens and a positive meniscus lens having a convex surface directed toward the object side. The second lens unit includes a cemented lens of a positive meniscus lens having a convex surface directed toward the object side, a negative meniscus lens having a convex surface directed toward the object side, and a biconvex positive lens. The third lens unit G3 includes a negative meniscus lens having a convex surface directed toward the image side.

An aspheric surface is used for five surfaces namely, both surfaces of the biconcave negative lens in the first lens unit G1, a surface on the object side of the positive meniscus lens and a surface on the image side of the biconvex positive lens in the second lens unit G2, and a surface on the object side of the negative meniscus lens in the third lens unit G3.

Figure 2A:
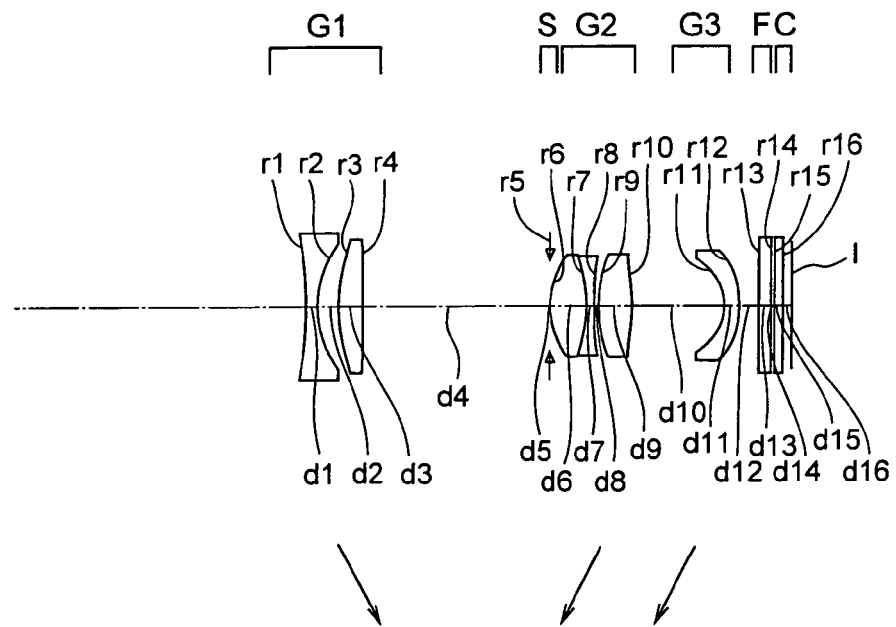
FIG. 2A, FIG. 2B, and FIG. 2C are diagrams similar to FIG. 1A, FIG. 1B, and FIG. 1C respectively, of a second embodiment of the zoom lens system according to the present invention.
Figure 2B:
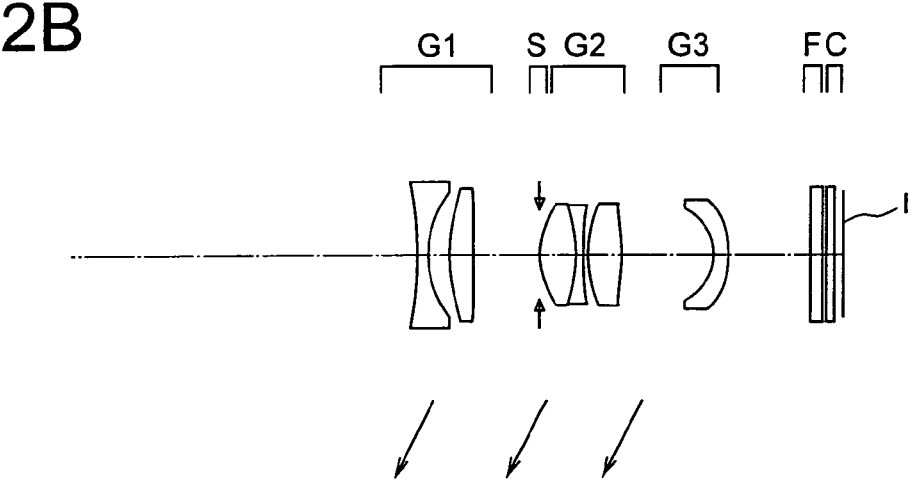
Figure 2C:
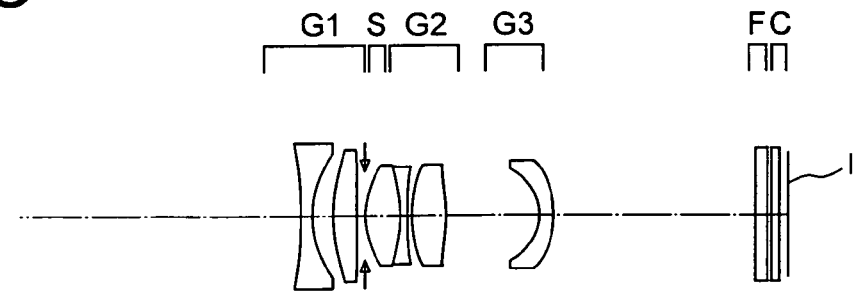

A zoom lens system in the second embodiment, as shown in FIG. 2A, FIG. 2B, and FIG. 2C, includes in order from the object side thereof, a first lens unit G1 having a negative refracting power, an aperture stop S, a second lens unit G2 having a positive refracting power, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3 moves only toward the object side.

In order from the object side, the first lens unit G1 includes a biconcave negative lens and a biconvex positive lens. The second lens unit G2 includes a cemented lens of a biconvex positive lens and a biconcave negative lens, and a biconvex positive lens. The third lens unit G3 includes a negative meniscus lens having a convex surface directed toward the image side.

An aspheric surface is used for three surfaces namely, a surface on the image side of the biconcave negative lens in the first lens unit G1, a surface on the object side of the biconvex positive lens on the object side and a surface on the image side of the biconvex positive lens on the image side in the second lens unit G2.

Figure 3A:
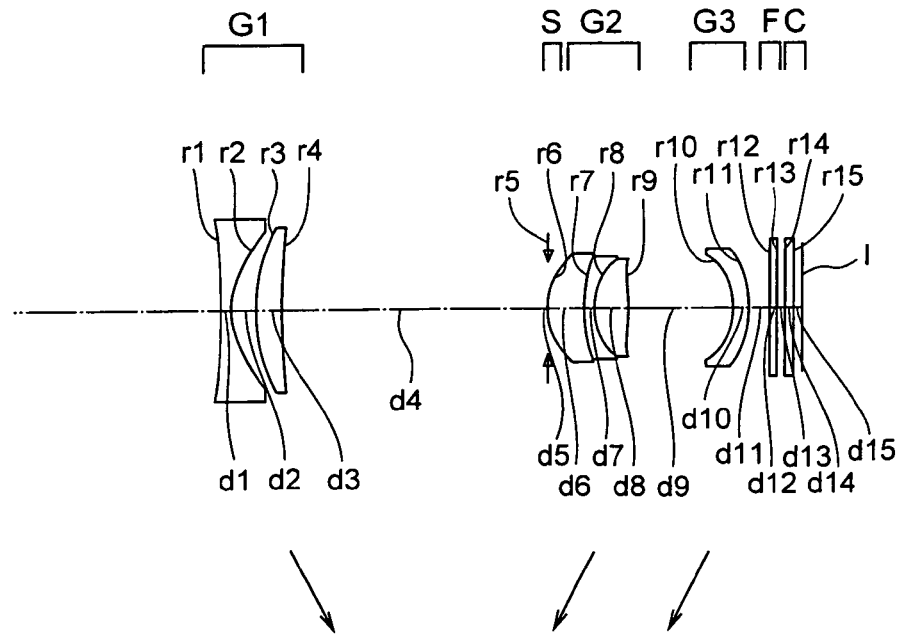
FIG. 3A, FIG. 3B, and FIG. 3C are diagrams similar to FIG. 1A, FIG. 1B, and FIG. 1C respectively, of a third embodiment of the zoom lens system according to the present invention.
Figure 3B:
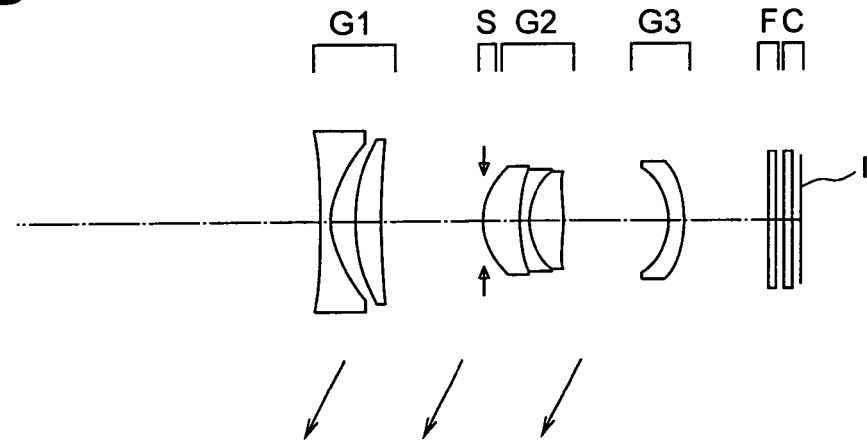
Figure 3C:
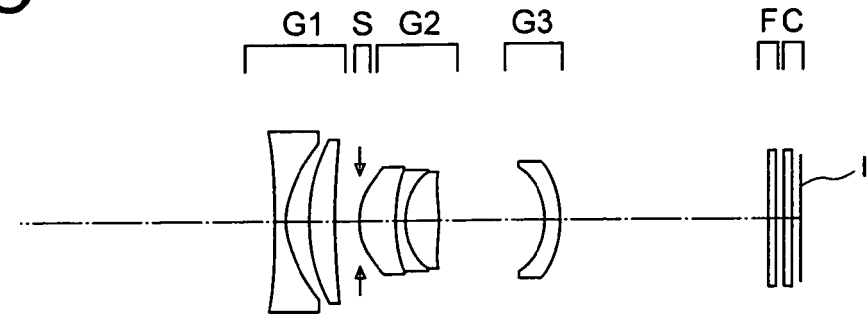

A zoom lens system in the third embodiment, as shown in FIG. 3A, FIG. 3B, and FIG. 3C, includes in order from the object side thereof, a first lens unit G1 having a negative refracting power, an aperture stop S, a second lens unit G2 having a positive refracting power, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3 moves only toward the object side.

In order from the object side, the first lens unit G1 includes a biconcave negative lens and a positive meniscus lens having a convex surface directed toward the object side. The second lens unit G2 includes a cemented lens of a positive meniscus lens having a convex surface directed toward the object side, a negative meniscus lens having a convex surface directed toward the object side, and a biconvex positive lens. The third lens unit G3 includes a negative meniscus lens having a convex surface directed toward the image side.

An aspheric surface is used for five surfaces namely, both surfaces of the biconcave negative lens in the first lens unit G1, a surface on the object side of the positive meniscus lens and a surface on the image side of the biconvex positive lens in the second lens unit G2, and a surface on the object side of the negative meniscus lens in the third lens unit G3.

Figure 4A:
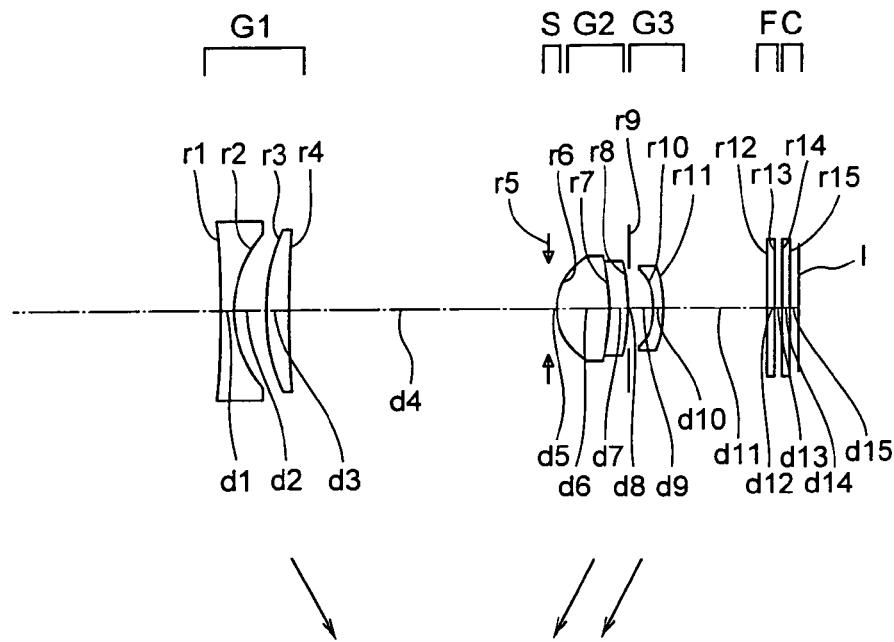
FIG. 4A, FIG. 4B, and FIG. 4C are diagrams similar to FIG. 1A, FIG. 1B, and FIG. 1C respectively, of a fourth embodiment of the zoom lens system according to the present invention.
Figure 4B:
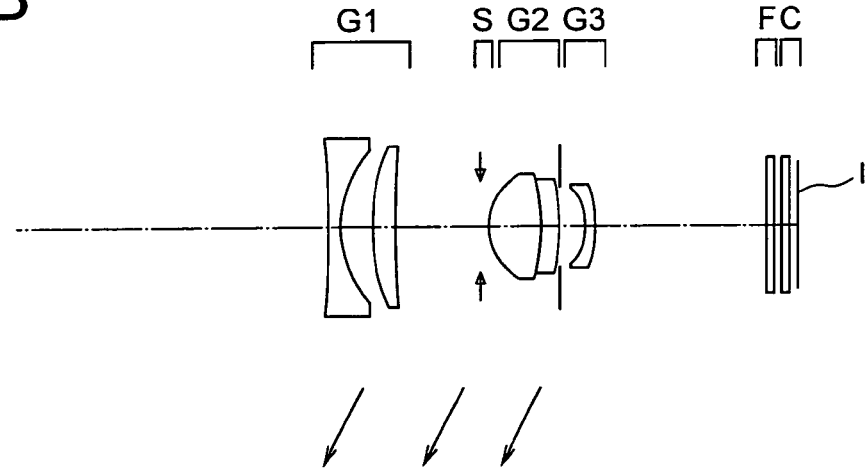
Figure 4C:
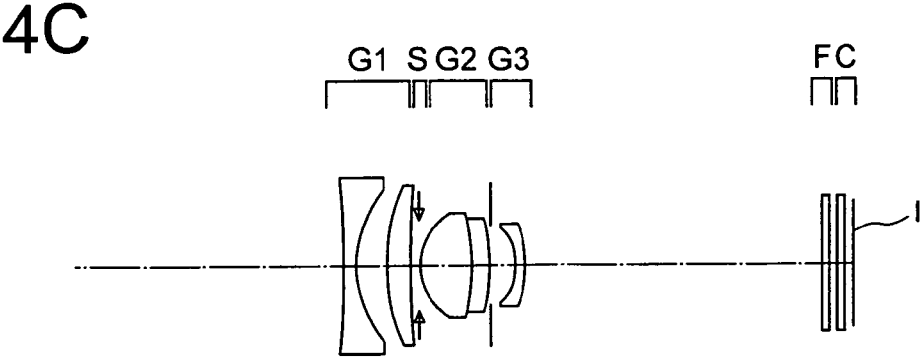

A zoom lens system in the fourth embodiment, as shown in FIG. 4A, FIG. 4B, and FIG. 4C, includes in order from the object side thereof, a first lens unit G1 having a negative refracting power, an aperture stop S, a second lens unit G2 having a positive refracting power, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3 moves only toward the object side.

In order from the object side, the first lens unit G1 includes a biconcave negative lens and a positive meniscus lens having a convex surface directed toward the object side. The second lens unit G2 includes a cemented lens of a biconvex positive lens and a negative meniscus lens having a convex surface directed toward the image side. The third lens unit G3 includes a negative meniscus lens having a convex surface directed toward the image side.

An aspheric surface is used for four surfaces namely, a surface on the image side of the biconcave negative lens in the first lens unit G1, a surface on the object side of the biconvex positive lens and a surface on the image side of the negative meniscus lens in the second lens unit G2, and a surface on the object side of the negative meniscus lens in the third lens unit G3.

Figure 5A:
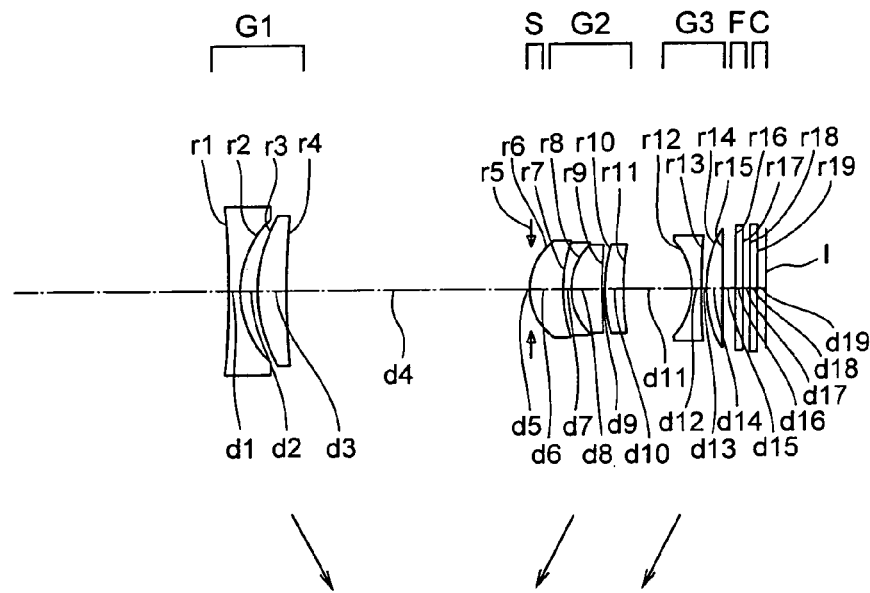
FIG. 5A, FIG. 5B, and FIG. 5C are diagrams similar to FIG. 1A, FIG. 1B, and FIG. 1C respectively, of a fifth embodiment of the zoom lens system according to the present invention.
Figure 5B:
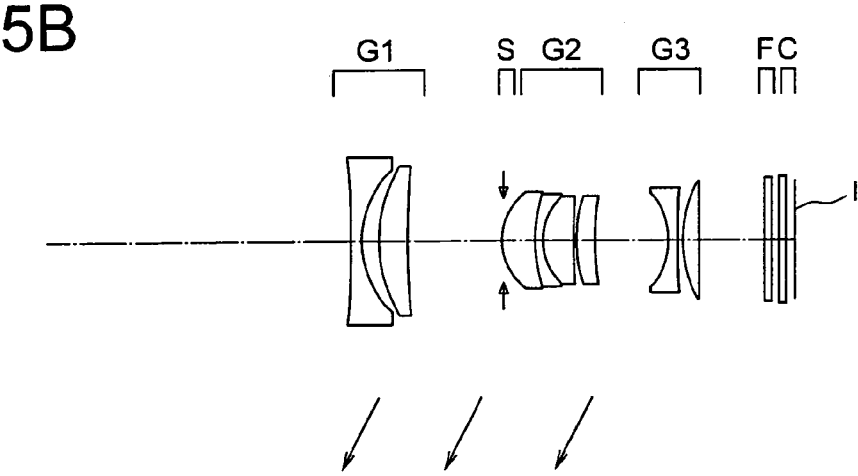
Figure 5C:
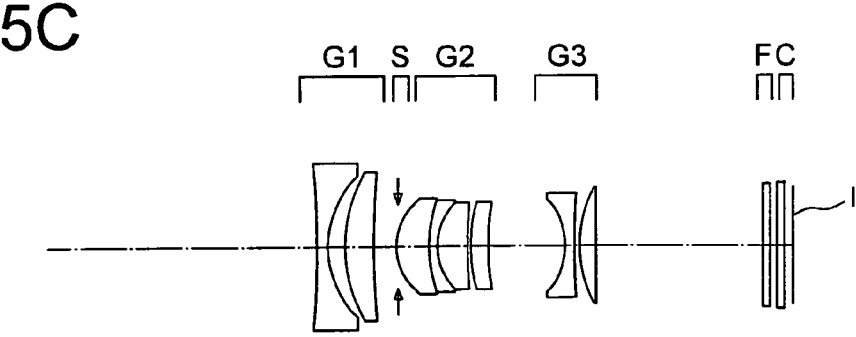
Figure 6A:
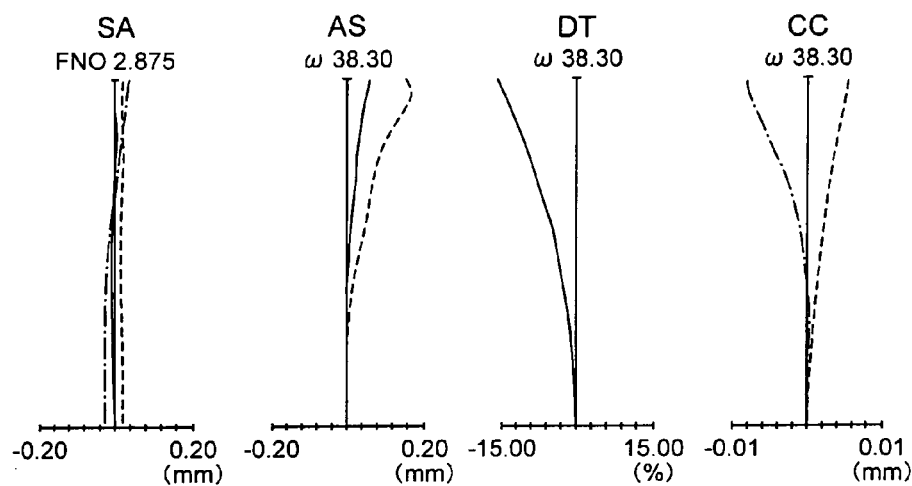
FIG. 6A, FIG. 6B, and FIG. 6C are diagrams showing a spherical aberration, an astigmatism, a distortion, and a chromatic aberration of magnification at the time of the infinite object point focusing, of the first embodiment, where.
Figure 6B:
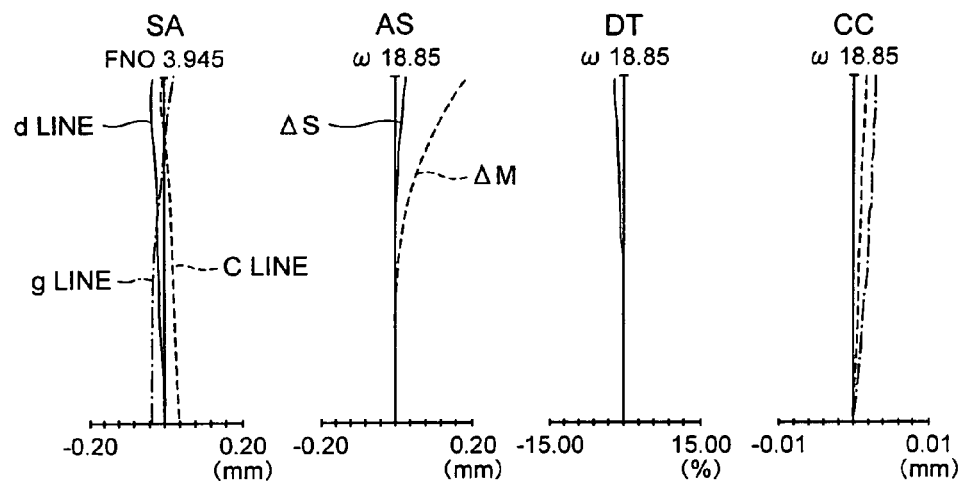
Figure 6C:
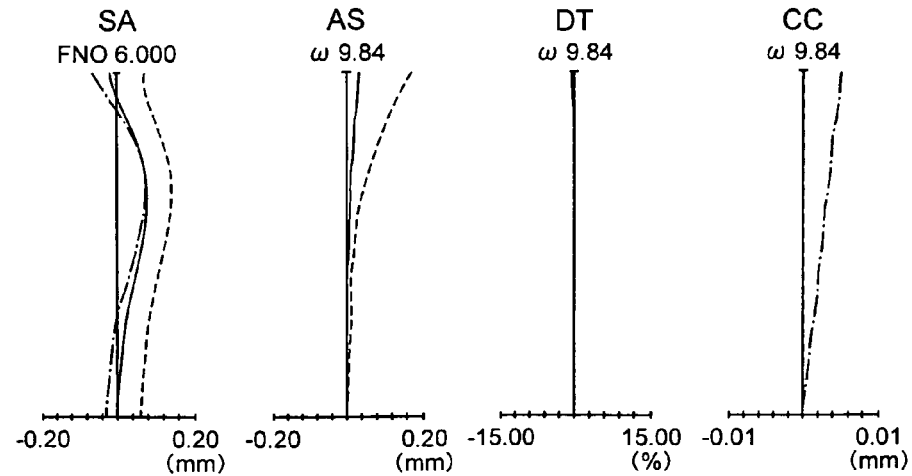
Figure 7A:
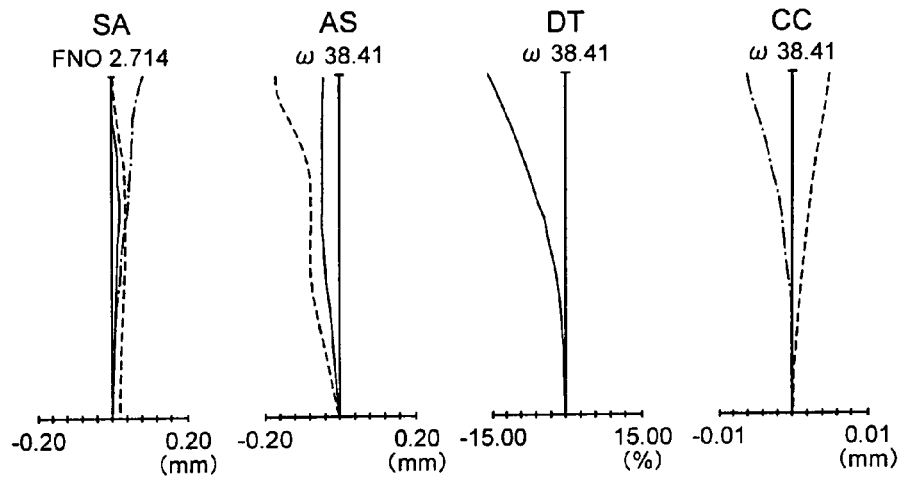
FIG. 7A, FIG. 7B, and FIG. 7C are diagrams similar to FIG. 6A, FIG. 6B, and FIG. 6C respectively, at the time of the infinite object point focusing, of the second embodiment.
Figure 7B:
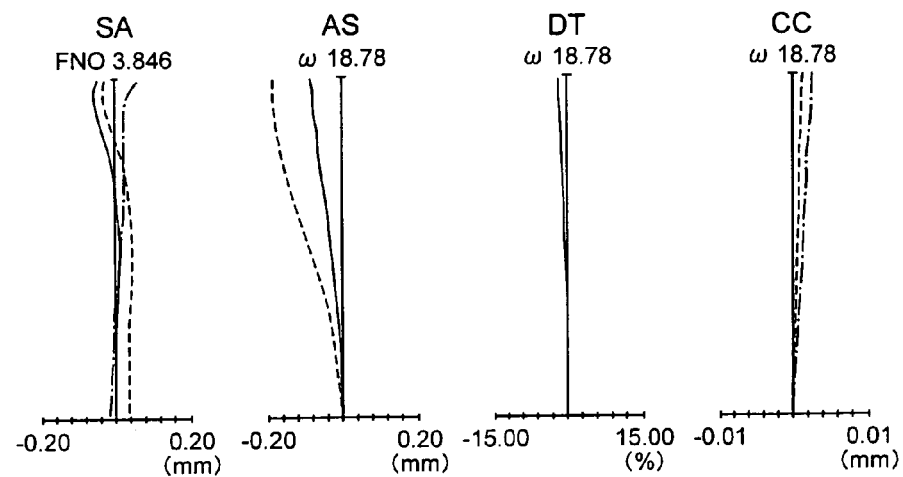
Figure 7C:
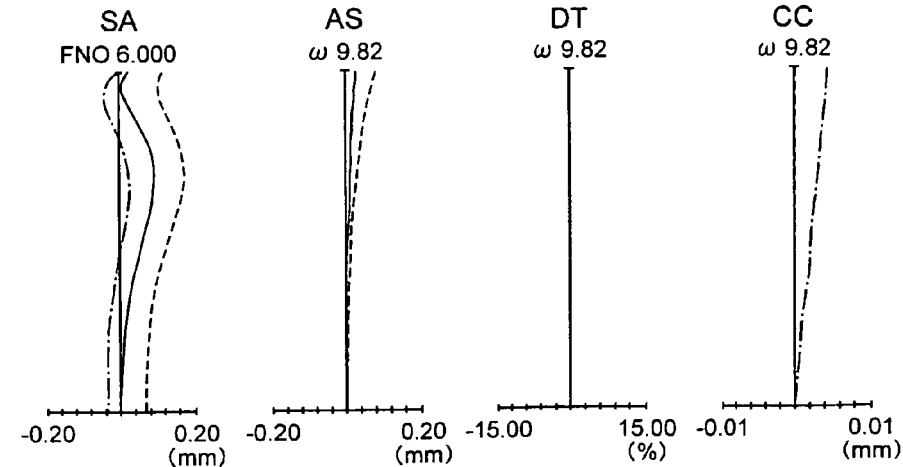
Figure 8A:
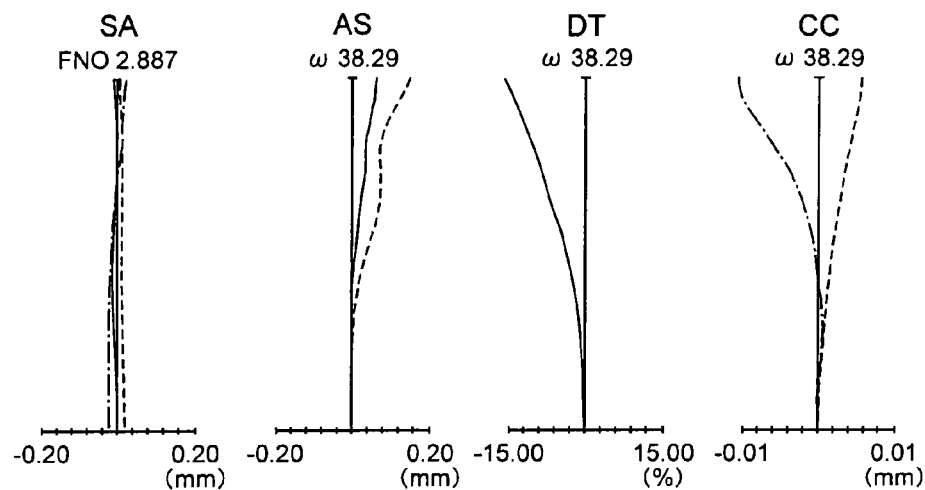
FIG. 8A, FIG. 8B, and FIG. 8C are diagrams similar to FIG. 6A, FIG. 6B, and FIG. 6C respectively, at the time of the infinite object point focusing, of the third embodiment.
Figure 8B:
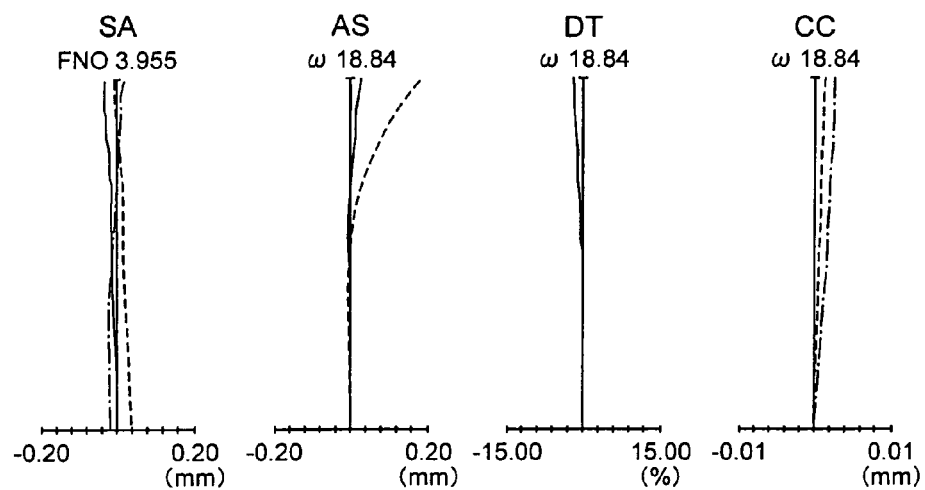
Figure 8C:
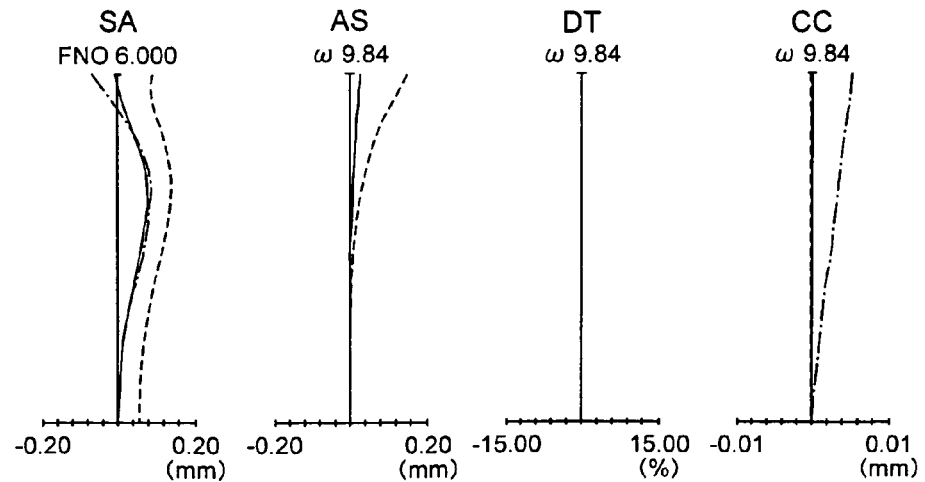
Figure 9A:
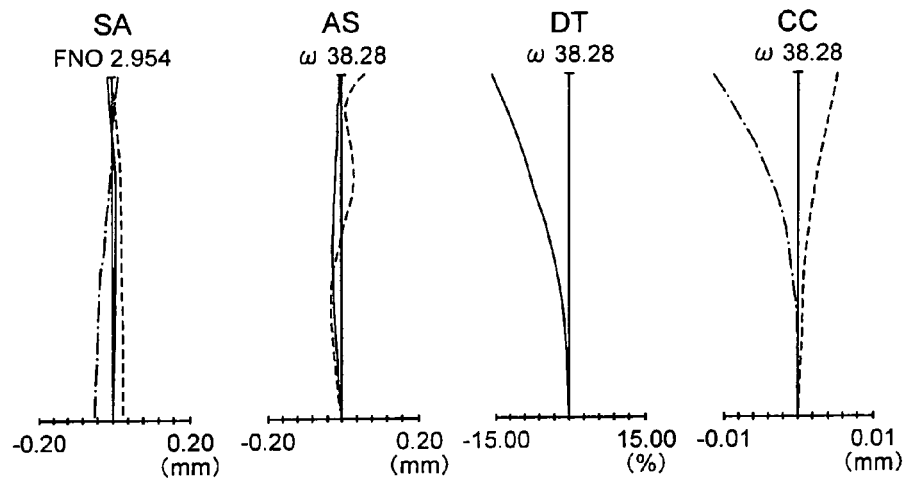
FIG. 9A, FIG. 9B, and FIG. 9C are diagrams similar to FIG. 6A, FIG. 6B, and FIG. 6C respectively, at the time of the infinite object point focusing, of the fourth embodiment.
Figure 9B:
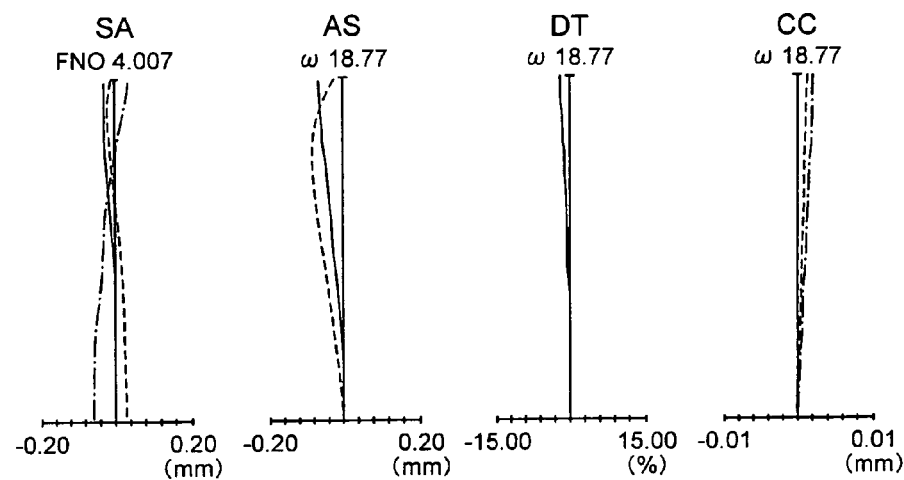
Figure 9C:
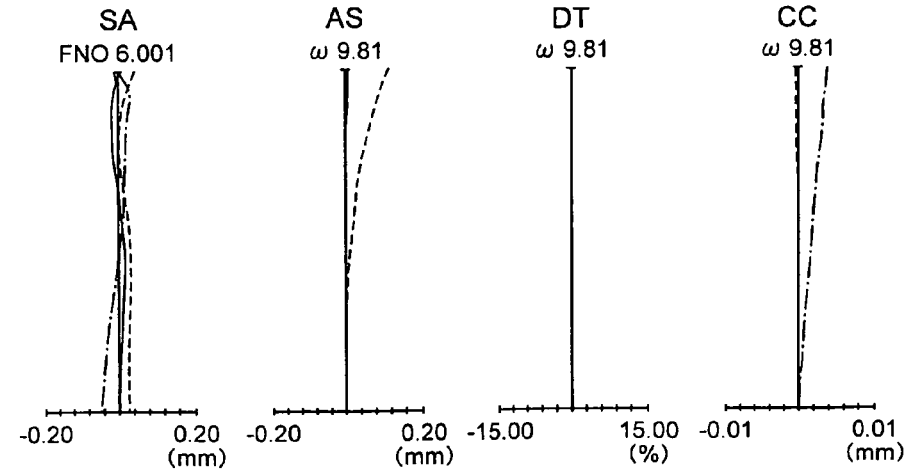
Figure 10A:
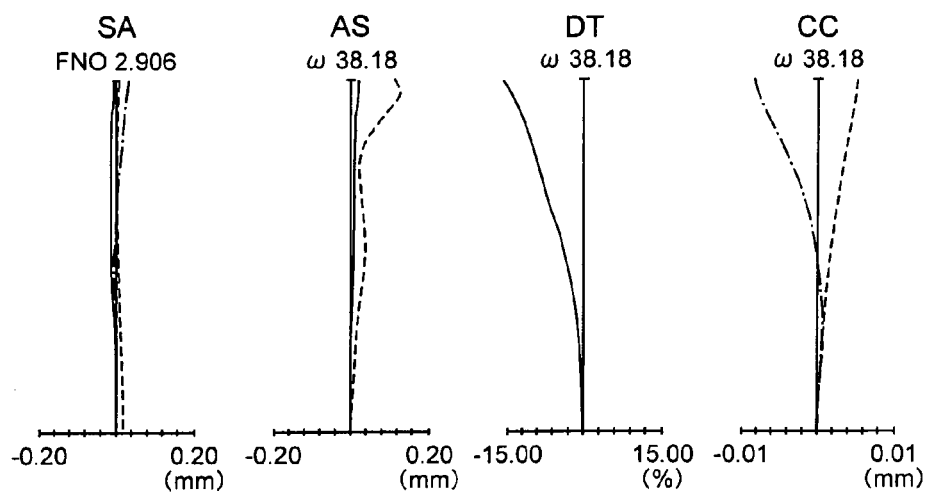
FIG. 10A, FIG. 10B, and FIG. 10C are diagrams similar to FIG. 6A, FIG. 6B, and FIG. 6C respectively, at the time of the infinite object point focusing, of the fifth embodiment.
Figure 10B:
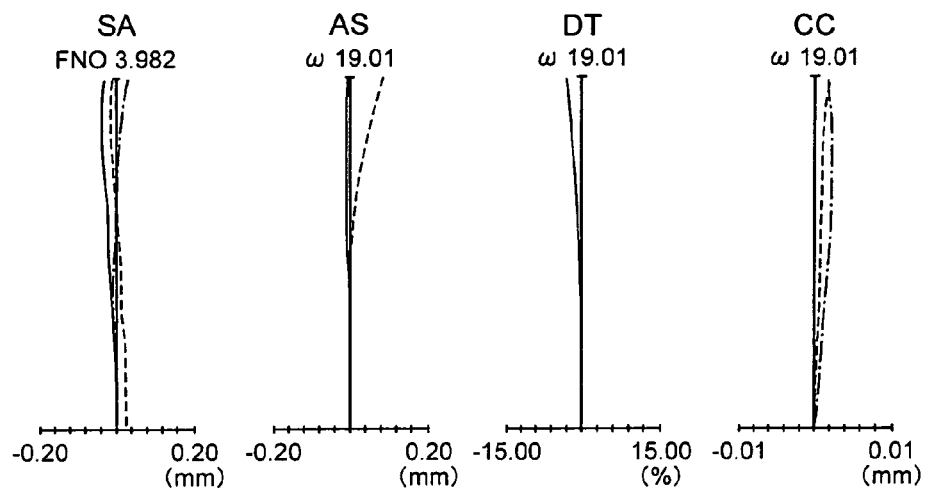
Figure 10C:
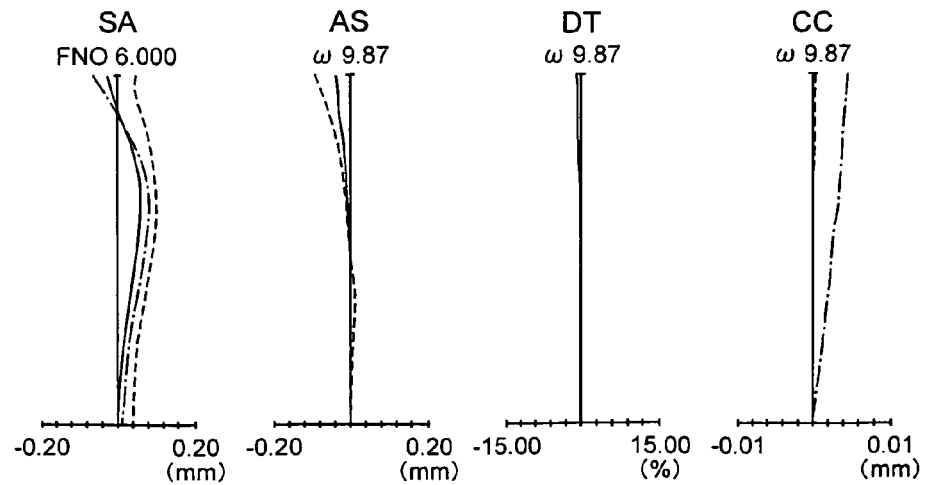

A zoom lens system in the fifth embodiment, as shown in FIG. 5A, FIG. 5B, and FIG. 5C, includes in order from the object side thereof, a first lens unit G1 having a negative refracting power, an aperture stop S, a second lens unit G2 having a positive refracting power, and a third lens unit G3 having a negative refracting power.

At the time of zooming from the wide angle end to the telephoto end, the first lens unit G1, after moving toward the image side, moves toward the object side. The second lens unit G2 moves only toward the object side. The third lens unit G3 moves only toward the object side.

In order from the object side, the first lens unit G1 includes a biconcave negative lens and a positive meniscus lens having a convex surface directed toward the object side. The second lens unit G2 includes a cemented lens of a positive meniscus lens having a convex surface directed toward the object side, a negative meniscus lens having a convex surface directed toward the object side, and a biconvex positive lens, and a positive meniscus lens having a convex surface directed toward the object side. The third lens unit G3 includes a biconcave negative lens and a positive meniscus lens having a convex surface directed toward the object side.

An aspheric surface is used for five surfaces namely, both surfaces of the biconcave negative lens in the first lens unit G1, a surface on the object side of the positive meniscus lens on the object side, and a surface on the image side of the biconvex positive lens in the second lens unit G2, and a surface on the object side of the biconcave negative lens in the third lens unit G3.

Numerical data of each embodiment described above is shown below. Apart from symbols described above, f denotes a focal length of the entire zoom lens system, $F_{NO}$ denotes an F number, $\omega$ denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A4\,y^4+A6\,y^6+A8\,y^8+A10\,y^{10}+A12\,y^{12}$$

where, r denotes a paraxial radius of curvature, K denotes a conical coefficient, A4, A6, A8, A10, and $A_{12}$ denote a spherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further "*" means that the surface is an aspheric surface, and "S" means that the surface is an aperture stop, "FS" means that the surface is a flare stop.

Example 1

| unit mm | | | |
|---|---|---|---|
| Surface data | | | |
| Surface No | r | d | nd | vd |

| Surface No | r | d | nd | vd |
|---|---|---|---|---|
| 1* | −113.961 | 0.70 | 1.88300 | 40.76 |
| 2* | 5.940 | 1.65 | | |
| 3 | 10.858 | 1.73 | 1.84666 | 23.78 |
| 4 | 50.171 | Variable | | |
| 5 (S) | ∞ | 0.00 | | |
| 6* | 4.509 | 2.40 | 1.51633 | 64.14 |
| 7 | 10.100 | 0.54 | 1.90366 | 31.32 |
| 8 | 3.983 | 2.15 | 1.62263 | 58.16 |
| 9* | −24.449 | Variable | | |
| 10* | −3.808 | 1.00 | 1.49700 | 81.54 |
| 11 | −5.865 | Variable | | |
| 12 | ∞ | 0.50 | 1.53996 | 59.45 |
| 13 | ∞ | 0.50 | | |
| 14 | ∞ | 0.49 | 1.51633 | 64.14 |
| 15 | ∞ | 0.58 | | |
| Image plane (light receiving surface) | | | | |

Aspherical coefficients

1st surface

K = 0.000, A4 = −5.53177e−04, A6 = 3.25017e−05, A8 = −8.64611e−07, A10 = 8.14308e−09

2nd surface

K = 0.000, A4 = −1.03578e−03, A6 = 2.37354e−05, A8 = −4.40077e−07, A10 = −2.03801e−08

6th surface

K = −0.246, A4 = −1.98445e−04, A6 = −1.40006e−05, A8 = 1.28259e−06

9th surface

K = 13.738, A4 = 1.07699e−03, A6 = 1.12355e−05, A8 = 1.16855e−06, A10 = 6.46670e−07

10th surface

K = −0.461, A4 = −7.07395e−04, A6 = −5.05995e−05, A8 = −6.19626e−07, A10 = −1.06047e−07

Group focal length

| f1 = −12.40 | f2 = 9.28 | f3 = −26.06 |
|---|---|---|

Zoom data

| | WE | ST | TE |
|---|---|---|---|
| IH | 3.84 | 3.84 | 3.84 |
| F (mm) | 5.80 | 11.50 | 22.20 |
| Fno. | 2.87 | 3.95 | 6.00 |
| 2ω (°) | 76.60 | 37.70 | 19.69 |
| BF | 3.03 | 7.13 | 15.30 |
| Lens total length | 36.66 | 30.71 | 33.96 |
| d4 | 16.69 | 6.44 | 1.50 |
| d9 | 6.77 | 6.98 | 6.99 |
| d11 | 1.30 | 5.39 | 13.58 |

Example 2

| unit mm | | | |
|---|---|---|---|
| Surface data | | | |

| Surface No | r | d | nd | vd |
|---|---|---|---|---|
| 1 | −23.597 | 0.70 | 1.88300 | 40.76 |
| 2* | 6.226 | 1.43 | | |
| 3 | 12.104 | 1.52 | 1.84666 | 23.78 |
| 4 | −450.803 | Variable | | |
| 5 (S) | ∞ | 0.00 | | |
| 6* | 5.814 | 2.40 | 1.61772 | 49.81 |
| 7 | −10.102 | 0.50 | 2.00069 | 25.46 |
| 8 | 28.851 | 0.25 | | |
| 9 | 8.468 | 2.15 | 1.51742 | 52.43 |
| 10* | −12.126 | Variable | | |
| 11 | −3.573 | 1.00 | 1.61800 | 63.33 |
| 12 | −6.653 | Variable | | |
| 13 | ∞ | 0.84 | 1.53996 | 59.45 |
| 14 | ∞ | 0.26 | | |
| 15 | ∞ | 0.49 | 1.51633 | 64.14 |
| 16 | ∞ | 0.58 | | |
| Image plane (light receiving surface) | | | | |

Aspherical coefficients

2nd surface

K = 0.000, A4 = −6.75522e−04, A6 = 1.79460e−05, A8 = −1.93173e−06, A10 = 4.14591e−08

6th surface

K = −0.452, A4 = −2.82467e−05, A6 = 1.96831e−05, A8 = 2.08520e−07

10th surface

K = 0.000, A4 = 1.06303e−03, A6 = 3.27588e−05, A8 = −2.57123e−06, A10 = 2.03117e−07

Group focal length

| f1 = −11.15 | f2 = 8.05 | f3 = −14.26 |
|---|---|---|

Zoom data

| | WE | ST | TE |
|---|---|---|---|
| IH | 3.84 | 3.84 | 3.84 |
| F (mm) | 5.80 | 11.50 | 22.20 |
| Fno. | 2.71 | 3.85 | 6.00 |
| 2ω (°) | 76.82 | 37.55 | 19.64 |
| BF | 3.01 | 7.11 | 14.95 |
| Lens total length | 31.12 | 27.42 | 31.44 |
| d4 | 12.16 | 4.30 | 0.49 |
| d10 | 6.01 | 6.06 | 6.06 |
| d12 | 1.30 | 5.40 | 13.24 |

Example 3 unit mm

Surface data

| Surface No | r | d | nd | νd |
|---|---|---|---|---|
| 1* | −62.729 | 0.70 | 1.88300 | 40.76 |
| 2* | 5.852 | 1.51 | | |
| 3 | 11.451 | 1.66 | 2.00069 | 25.46 |
| 4 | 56.559 | Variable | | |
| 5 (S) | ∞ | 0.00 | | |
| 6* | 4.483 | 2.40 | 1.51633 | 64.14 |
| 7 | 11.667 | 0.62 | 1.90366 | 31.32 |
| 8 | 4.172 | 2.15 | 1.62263 | 58.16 |
| 9* | −23.523 | Variable | | |
| 10* | −4.173 | 1.00 | 1.49700 | 81.54 |
| 11 | −6.653 | Variable | | |
| 12 | ∞ | 0.50 | 1.53996 | 59.45 |
| 13 | ∞ | 0.50 | | |
| 14 | ∞ | 0.49 | 1.51633 | 64.14 |
| 15 | ∞ | 0.58 | | |
| Image plane (light receiving surface) | | | | |

Aspherical coefficients

1st surface

K = 0.000, A4 = −5.96485e−04, A6 = 3.58482e−05, A8 = −9.13819e−07, A10 = 7.87055e−09

2nd surface

K = 0.000, A4 = −1.17758e−03, A6 = 2.71790e−05, A8 = −4.34015e−07, A10 = −2.58636e−08

6th surface

K = −0.271, A4 = −1.55770e−04, A6 = −1.24411e−05, A8 = 1.56677e−06

9th surface

K = 5.238, A4 = 1.15790e−03, A6 = 1.61626e−05, A8 = 1.90077e−06, A10 = 7.47798e−07

10th surface

K = −0.261, A4 = −2.50820e−04, A6 = −2.61630e−05, A8 = −1.29687e−06, A10 = 4.23771e−08

Group focal length

| f1 = −12.65 | f2 = 9.29 | f3 = −26.01 |
|---|---|---|

Zoom data

| | WE | ST | TE |
|---|---|---|---|
| IH | 3.84 | 3.84 | 3.84 |
| F (mm) | 5.80 | 11.50 | 22.20 |
| Fno. | 2.89 | 3.95 | 6.00 |
| 2ω (°) | 76.57 | 37.67 | 19.67 |
| BF | 3.03 | 7.10 | 15.13 |
| Lens total length | 36.66 | 30.49 | 33.49 |
| d4 | 16.94 | 6.53 | 1.50 |
| d9 | 6.65 | 6.82 | 6.82 |
| d11 | 1.30 | 5.37 | 13.40 |

Example 4 unit mm

Surface data

| Surface No | r | d | nd | νd |
|---|---|---|---|---|
| 1 | −44.119 | 0.70 | 1.88300 | 40.76 |
| 2* | 6.743 | 2.11 | | |
| 3 | 13.925 | 1.48 | 2.00069 | 25.46 |
| 4 | 67.476 | Variable | | |
| 5 (S) | ∞ | 0.00 | | |
| 6* | 3.809 | 3.42 | 1.49700 | 81.54 |
| 7 | −13.130 | 1.14 | 2.00069 | 25.46 |
| 8* | −19.141 | 0.10 | | |
| 9 (FS) | ∞ | Variable | | |
| 10* | −4.878 | 0.70 | 1.90366 | 31.32 |
| 11 | −8.942 | Variable | | |
| 12 | ∞ | 0.50 | 1.53996 | 59.45 |
| 13 | ∞ | 0.50 | | |
| 14 | ∞ | 0.49 | 1.51633 | 64.14 |
| 15 | ∞ | 0.58 | | |
| Image plane (light receiving surface) | | | | |

Aspherical coefficients

2nd surface

K = 0.000, A4 = −3.98131e−04, A6 = 5.35977e−06, A8 = −5.75098e−07, A10 = 6.89098e−09

6th surface

K = −0.272, A4 = −5.88555e−07, A6 = 5.16624e−06, A8 = 6.09708e−07

8th surface

K = 0.000, A4 = 4.38763e−04, A6 = −3.60378e−05, A8 = −1.51518e−06

10th surface

K = 2.233, A4 = 3.88532e−04, A6 = −7.90831e−06, A8 = −2.22240e−05, A10 = 2.80129e−06

Group focal length

| f1 = −13.01 | f2 = 7.29 | f3 = −12.93 |
|---|---|---|

Zoom data

| | WE | ST | TE |
|---|---|---|---|
| IH | 3.84 | 3.84 | 3.84 |
| F (mm) | 5.80 | 11.50 | 22.20 |
| Fno. | 2.95 | 4.01 | 6.00 |
| 2ω (°) | 76.55 | 37.54 | 19.63 |
| BF | 2.74 | 6.51 | 13.56 |
| Lens total length | 36.66 | 30.45 | 32.82 |
| d4 | 17.07 | 5.95 | 0.49 |
| d9 | 1.56 | 1.56 | 1.57 |
| d11 | 6.64 | 11.02 | 19.21 |

Example 5 unit mm

Surface data

| Surface No | r | d | nd | νd |
|---|---|---|---|---|
| 1* | −111.266 | 0.70 | 1.88300 | 40.76 |
| 2* | 5.909 | 1.26 | | |
| 3 | 10.112 | 1.96 | 1.84666 | 23.78 |
| 4 | 50.504 | Variable | | |
| 5 (S) | ∞ | 0.00 | | |
| 6* | 4.481 | 2.40 | 1.51633 | 64.14 |
| 7 | 11.342 | 0.50 | 1.90366 | 31.32 |
| 8 | 4.207 | 2.15 | 1.62263 | 58.16 |
| 9* | −252.084 | 0.14 | | |
| 10 | 9.356 | 1.25 | 1.49700 | 81.54 |
| 11 | 18.335 | Variable | | |
| 12* | −5.905 | 0.70 | 1.49700 | 81.54 |
| 13 | 30.761 | 0.37 | | |

-continued unit mm

| | | | | |
|---|---|---|---|---|
| 14 | 9.095 | 1.00 | 1.51823 | 58.90 |
| 15 | 98.713 | Variable | | |
| 16 | ∞ | 0.50 | 1.53996 | 59.45 |
| 17 | ∞ | 0.50 | | |
| 18 | ∞ | 0.49 | 1.51633 | 64.14 |
| 19 | ∞ | 0.58 | | |
| Image plane (light receiving surface) | | | | |

Aspherical coefficients

1st surface $K = 0.000, A4 = -6.02756e-04, A6 = 3.47805e-05, A8 = -9.06023e-07, A10 = 8.53020e-09$ 2nd surface $K = 0.000, A4 = -1.05771e-03, A6 = 2.49321e-05, A8 = -5.65594e-07, A10 = -1.63882e-08$ 6th surface $K = -0.246, A4 = -1.27449e-04, A6 = -7.86582e-06, A8 = 1.17400e-06$ 9th surface $K = 5390.316, A4 = 1.01581e-03, A6 = 3.65454e-05, A8 = 1.66136e-06, A10 = 7.32860e-07$ 12th surface $K = 0.385, A4 = -1.03478e-03, A6 = -3.03171e-06, A8 = -1.20709e-05, A10 = 9.65850e-07$ Group focal length

| f1 = -12.77 | f2 = 8.90 | f3 = -22.03 |
|---|---|---|

Zoom data

| | WE | ST | TE |
|---|---|---|---|
| IH | 3.84 | 3.84 | 3.84 |
| F (mm) | 5.80 | 11.50 | 22.20 |
| Fno. | 2.91 | 3.98 | 6.00 |
| 2ω (°) | 76.35 | 38.01 | 19.75 |
| BF | 2.74 | 6.51 | 13.56 |
| Lens total length | 36.66 | 30.45 | 32.82 |
| d4 | 16.74 | 6.52 | 1.50 |
| d11 | 4.75 | 4.98 | 5.32 |
| d15 | 1.00 | 4.78 | 11.83 |

In embodiments from a sixth embodiment to a tenth embodiment, the zoom lens systems in the embodiments from the first embodiment to the fifth embodiment respectively are used. The embodiments from the sixth embodiment to the tenth embodiment are examples in which an image pickup apparatus which corrects the distortion electrically is used, and a shape of the effective image pickup area changes at the time of zooming. Therefore, these embodiments differ from embodiments in which the image height and the image angle in a zoom state correspond.

The image pickup apparatus is an apparatus which includes a zoom lens system having a half image angle ω of 34° and more at the wide angle end.

In the embodiments from the sixth embodiment to the tenth embodiment, an image is recorded and displayed upon correcting electrically a barrel distortion which occurs at the wide angle side.

In the zoom lens system of these embodiments, a barrel distortion occurs at the wide angle end, on a rectangular photoelectric conversion surface. Whereas, an occurrence of distortion at the telephoto end and near the intermediate focal length state, is suppressed.

For correcting the distortion electrically, the effective image pickup area is let to be barrel shaped at the wide angle end, and rectangular shaped at the intermediate focal length state and the telephoto end.

Moreover, the effective image pickup area which is set in advance is subjected to image conversion by an image processing, and is converted to rectangular image information in which the distortion is reduced.

An arrangement is made such that, the maximum image height $IH_w$ at the wide angle end becomes smaller than the maximum image height $IH_s$ at the intermediate focal length state, and the image height $IH_t$ at the telephoto end.

In the embodiments from the sixth embodiment to the tenth embodiment, an arrangement is made such that, at the wide angle end, a length in a direction of a short side of the photoelectric conversion surface is same as a length in a direction of short side of the effective image pickup area, and the effective image pickup area is set to be such that, about −3% of distortion remains after the image processing. As a matter of course, an arrangement may be made such that, an image in which, a barrel shaped area smaller than this is converted to a rectangular shape as the effective image pickup area, is let to be an image which is recorded and reproduced.

A zoom lens system of the sixth embodiment has a structure similar to a structure of the zoom lens system of the first embodiment.

A zoom lens system of the seventh embodiment has a structure similar to a structure of the zoom lens system of the second embodiment.

A zoom lens system of the eighth embodiment has a structure similar to a structure of the zoom lens system of the third embodiment.

A zoom lens system of the ninth embodiment has a structure similar to a structure of the zoom lens system of the fourth embodiment.

A zoom lens system of the tenth embodiment has a structure similar to a structure of the zoom lens system of the fifth embodiment.

Data of image height and total image angle in example 6 are as shown below.

Zoom data

| | WE | ST | TE |
|---|---|---|---|
| F(mm) | 5.80 | 11.50 | 22.20 |
| Fno. | 2.87 | 3.95 | 6.00 |
| 2ω(°) | 68.64 | 37.70 | 19.69 |
| IH | 3.46 | 3.84 | 3.84 |

Data of image height and total image angle in example 7 are as shown below.

Zoom data

| | WE | ST | TE |
|---|---|---|---|
| F(mm) | 5.80 | 11.50 | 22.20 |
| Fno. | 2.71 | 3.85 | 6.00 |
| 2ω(°) | 68.63 | 37.55 | 19.64 |
| IH | 3.45 | 3.84 | 3.84 |

Data of image height and total image angle in example 8 are as shown below.

Zoom data

|  | WE | ST | TE |
|---|---|---|---|
| F(mm) | 5.80 | 11.50 | 22.20 |
| Fno. | 2.89 | 3.95 | 6.00 |
| 2ω(°) | 68.63 | 37.67 | 19.67 |
| IH | 3.46 | 3.84 | 3.84 |

Data of image height and total image angle in example 9 are as shown below.

Zoom data

|  | WE | ST | TE |
|---|---|---|---|
| F(mm) | 5.80 | 11.50 | 22.20 |
| Fno. | 2.95 | 4.01 | 6.00 |
| 2ω(°) | 68.63 | 37.54 | 19.63 |
| IH | 3.45 | 3.84 | 3.84 |

Data of image height and total image angle in example 10 are as shown below.

Zoom data

|  | WE | ST | TE |
|---|---|---|---|
| F(mm) | 5.80 | 11.50 | 22.20 |
| Fno. | 2.91 | 3.98 | 6.00 |
| 2ω(°) | 68.64 | 38.01 | 19.75 |
| IH | 3.46 | 3.84 | 3.84 |

Aberration diagrams at the time of the infinite object point focusing of the embodiment from the first embodiment to the fifth embodiment are shown in FIG. 6A to FIG. 10C. In these aberration diagrams, FIG. 6A, FIG. 7A, FIG. 8A, FIG. 9A, and FIG. 10A show a spherical aberration, an astigmatism, a distortion, and a chromatic aberration of magnification respectively, at the wide angle end, FIG. 6B, FIG. 7B, FIG. 8B, FIG. 9B, and FIG. 10B show a spherical aberration, an astigmatism, a distortion, and a chromatic aberration of magnification respectively, at the intermediate focal length state, and FIG. 6C, FIG. 7C, FIG. 8C, FIG. 9C, and FIG. 10C show a spherical aberration, an astigmatism, a distortion, and a chromatic aberration of magnification at the telephoto end. In each diagram, 'ω' shows a half image angle.

Values of conditional expressions (1) to (8) in the embodiments are given below.

|  | Example 1 | Example 2 | Example 3 | Example 4 | Example 5 |
|---|---|---|---|---|---|
| (1) $f_t/f_w$ | 3.83 | 3.83 | 3.83 | 3.83 | 3.83 |
| (2) $d_{G3}/f_w$ | 0.17 | 0.17 | 0.17 | 0.12 | 0.36 |
| (3) $D_w/f_w$ | 6.32 | 5.37 | 6.32 | 6.32 | 6.32 |
| (4) $D_t/f_t$ | 1.53 | 1.42 | 1.51 | 1.47 | 1.48 |
| (5) $\Delta G_3/\Delta G_2$ | 0.98 | 1.00 | 0.99 | 1.00 | 0.95 |
| (6) $(r_{L11} + r_{L12})/(r_{L11} - r_{L12})$ | 0.90 | 0.58 | 0.83 | 0.73 | 0.90 |
| (7) N | 6 | 6 | 6 | 5 | 8 |
| (8) EX(w) | −17.96 | −20.85 | −18.27 | −17.34 | −17.31 |

|  | Example 6 | Example 7 | Example 8 | Example 9 | Example 10 |
|---|---|---|---|---|---|
| (1) $f_t/f_w$ | 3.83 | 3.83 | 3.83 | 3.83 | 3.83 |
| (2) $d_{G3}/f_w$ | 0.17 | 0.17 | 0.17 | 0.12 | 0.36 |
| (3) $D_w/f_w$ | 6.32 | 5.37 | 6.32 | 6.32 | 6.32 |
| (4) $D_t/f_t$ | 1.53 | 1.42 | 1.51 | 1.47 | 1.48 |
| (5) $\Delta G_3/\Delta G_2$ | 0.98 | 1.00 | 0.99 | 1.00 | 0.95 |
| (6) $(r_{L11} + r_{L12})/(r_{L11} - r_{L12})$ | 0.90 | 0.58 | 0.83 | 0.73 | 0.90 |
| (7) N | 6 | 6 | 6 | 5 | 8 |
| (8) EX(w) | −16.29 | −18.89 | −16.55 | −15.65 | −16.30 |

Values of conditional expressions (21) to (30) in the embodiments are given below.

|  | Example 1 | Example 2 | Example 3 | Example 4 | Example 5 |
|---|---|---|---|---|---|
| (21) $f_t/f_w$ | 3.83 | 3.83 | 3.83 | 3.83 | 3.83 |
| (22) $\beta_2(t)/\beta_2(w)$ | 2.75 | 2.34 | 2.76 | 2.44 | 2.73 |
| (23) $\beta_3(t)/\beta_3(w)$ | 1.39 | 1.64 | 1.39 | 1.54 | 1.40 |
| (24) $(r_{L31} + r_{L32})/(r_{L31} - r_{L32})$ | −4.70 | −3.32 | −4.37 | −3.40 | — |
| (25) $D_w/f_w$ | 6.32 | 5.37 | 6.32 | 6.32 | 6.32 |
| (26) $D_t/f_t$ | 1.53 | 1.42 | 1.51 | 1.47 | 1.48 |
| (27) $\Delta G_3/\Delta G_2$ | 0.98 | 1.00 | 0.99 | 1.00 | 0.95 |
| (28) $(r_{L11} + r_{L12})/(r_{L11} - r_{L12})$ | 0.90 | 0.58 | 0.83 | 0.73 | 0.90 |
| (29) N | 6 | 6 | 6 | 5 | 8 |
| (30) EX(w) | −17.96 | −20.85 | −18.27 | −17.34 | −17.31 |

|  | Example 6 | Example 7 | Example 8 | Example 9 | Example 10 |
|---|---|---|---|---|---|
| (21) $f_t/f_w$ | 3.83 | 3.83 | 3.83 | 3.83 | 3.83 |
| (22) $\beta_2(t)/\beta_2(w)$ | 2.75 | 2.34 | 2.76 | 2.44 | 2.73 |
| (23) $\beta_3(t)/\beta_3(w)$ | 1.39 | 1.64 | 1.39 | 1.54 | 1.40 |
| (24) $(r_{L31} + r_{L32})/(r_{L31} - r_{L32})$ | −4.70 | −3.32 | −4.37 | −3.40 | — |
| (25) $D_w/f_w$ | 6.32 | 5.37 | 6.32 | 6.32 | 6.32 |
| (26) $D_t/f_t$ | 1.53 | 1.42 | 1.51 | 1.47 | 1.48 |
| (27) $\Delta G_3/\Delta G_2$ | 0.98 | 1.00 | 0.99 | 1.00 | 0.95 |
| (28) $(r_{L11} + r_{L12})/(r_{L11} - r_{L12})$ | 0.90 | 0.58 | 0.83 | 0.73 | 0.90 |
| (29) N | 6 | 6 | 6 | 5 | 8 |
| (30) EX(w) | −16.29 | −18.89 | −16.55 | −15.65 | −16.30 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 11:
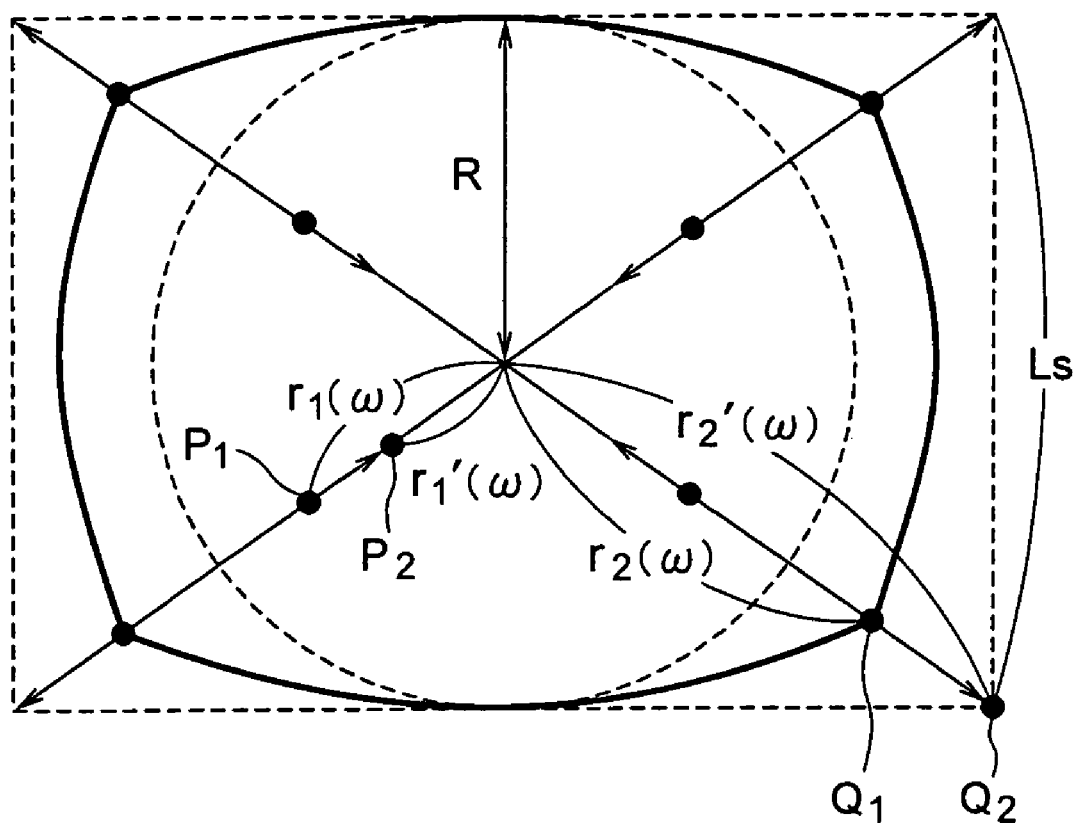
FIG. 11 is a diagram describing a correction of distortion.

For example, as shown in FIG. 11, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 11, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \tan \omega (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel $(Xi, Yj)$, a method of determining coordinates of a destination of movement $(Xi', Yj')$ may be used. When two or more points $(Xi, Yj)$ have moved to the coordinates $(Xi', Yj')$, an average of values of each pixel is taken. Moreover, when there is no point which has moved, interpolation may be performed by using a value of coordinate $(Xi', Yj')$ of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega) - r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 \, Ls$$

where, Ls is a length of a short side of the effective image pickup surface.

It is preferable that the radius R satisfies the following conditional expression.

0.3 Ls≦R≦0.6 Ls

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $r'(\omega) = \alpha f \tan \omega$ near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $r'(\omega) = \alpha f \tan \omega$ near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $f = y/\tan \omega$ holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $f > y/\tan \omega$.

In other words, when the focal length f of the imaging system, and the image height y are let to be fixed, a value of ω becomes large.

(Digital Camera)

Figure 12:
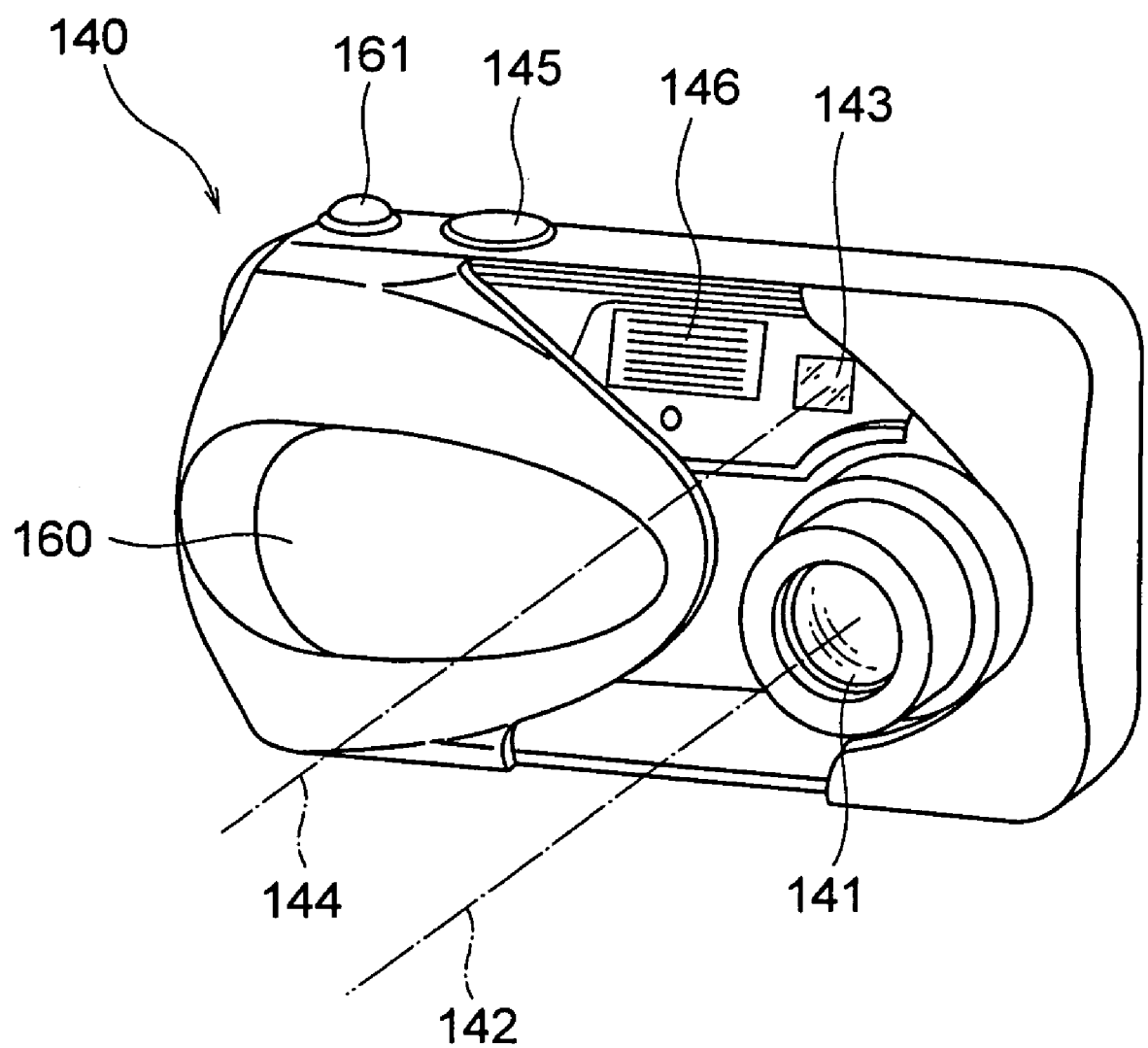
FIG. 12 is a front perspective view showing an appearance of a digital camera in which, a zoom lens system according to the present invention is incorporated.
Figure 13:
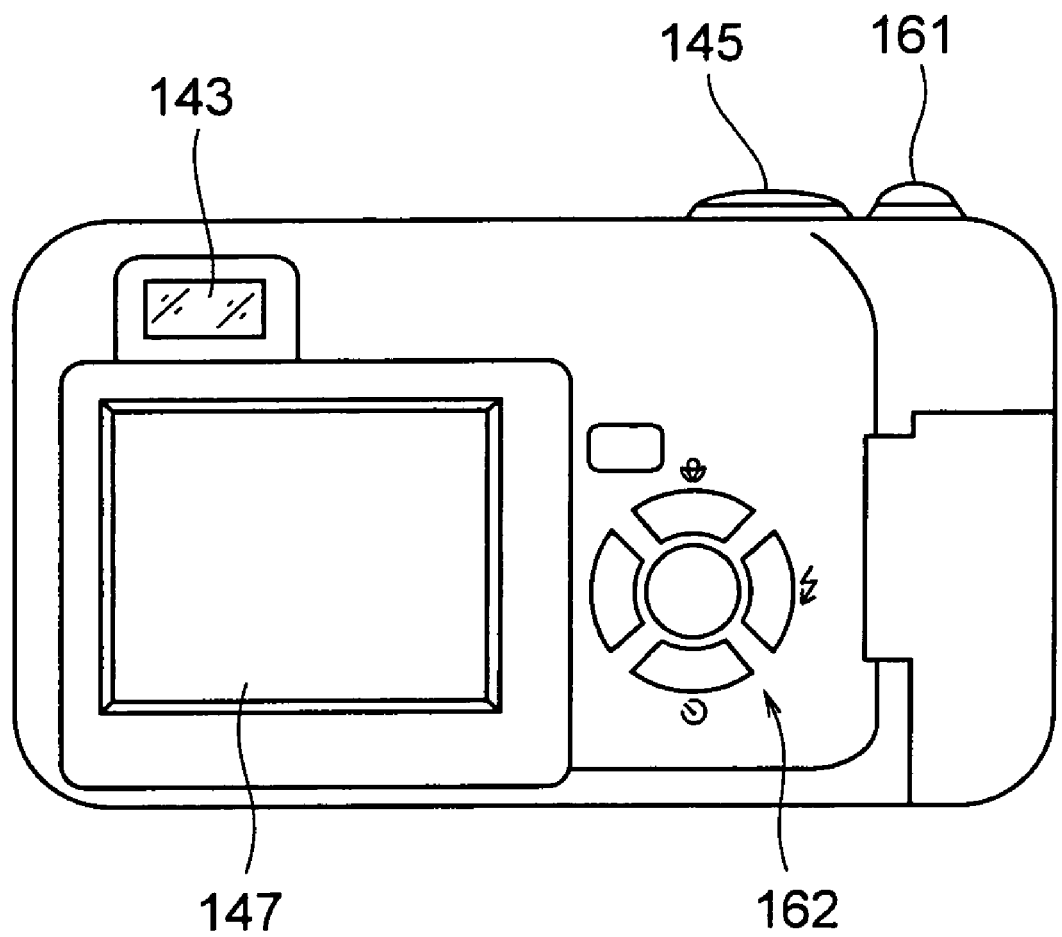
FIG. 13 is a rear perspective view of the digital camera in FIG. 12.
Figure 14:
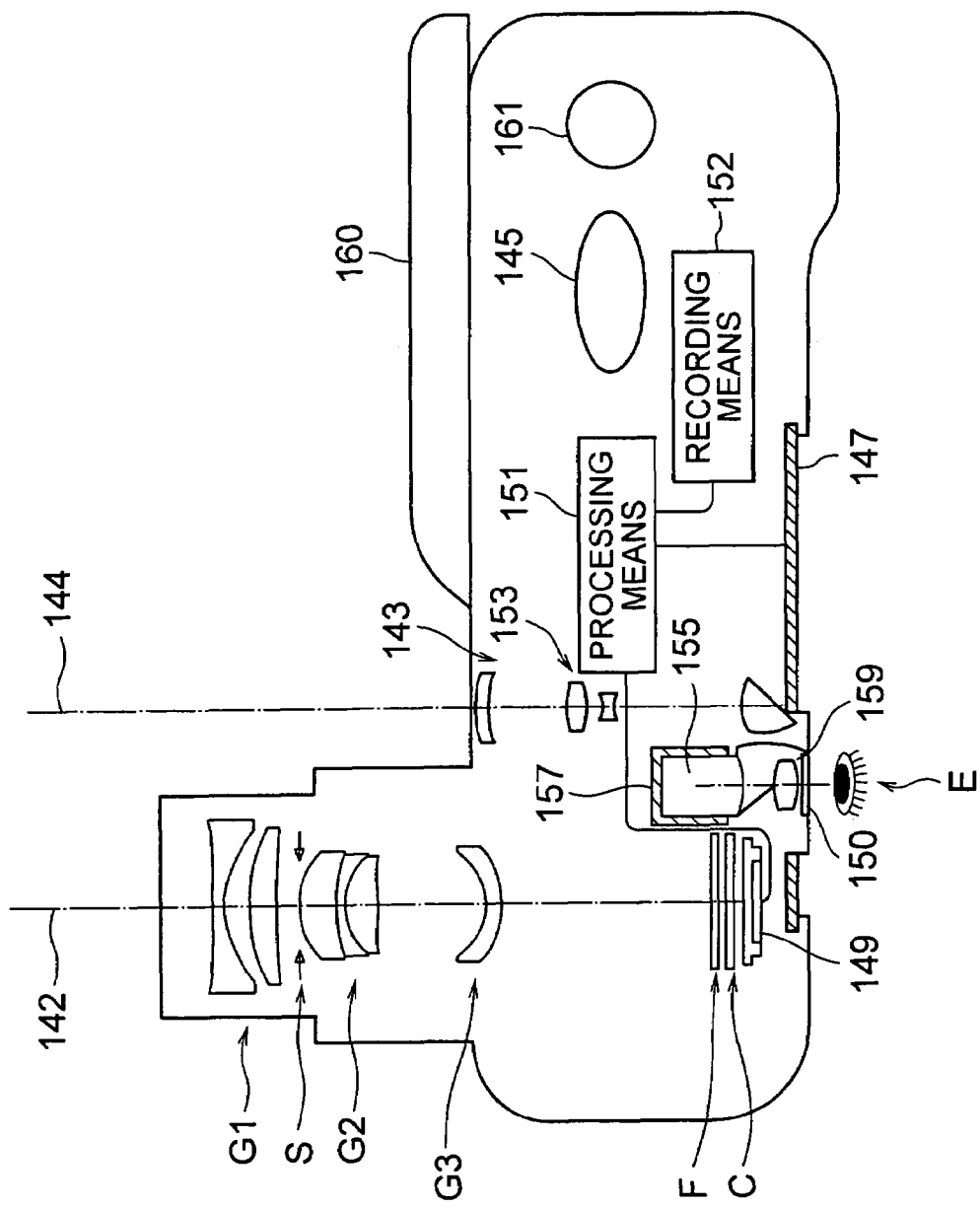
FIG. 14 is a cross-sectional view of the digital camera in FIG. 12.

FIG. 12 to FIG. 14 are conceptual diagrams of a structure of a digital camera according to the present invention in which a zoom lens system described above is incorporated in a taking optical system 141. FIG. 12 is a front perspective view showing an appearance of a digital camera 140, FIG. 13 is a rear perspective view of the same, and FIG. 14 is a schematic cross-sectional view showing a structure of the digital camera 140. In FIG. 12 and FIG. 14, show an uncollapsed state (lens is not drawn out) of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 12, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 15:
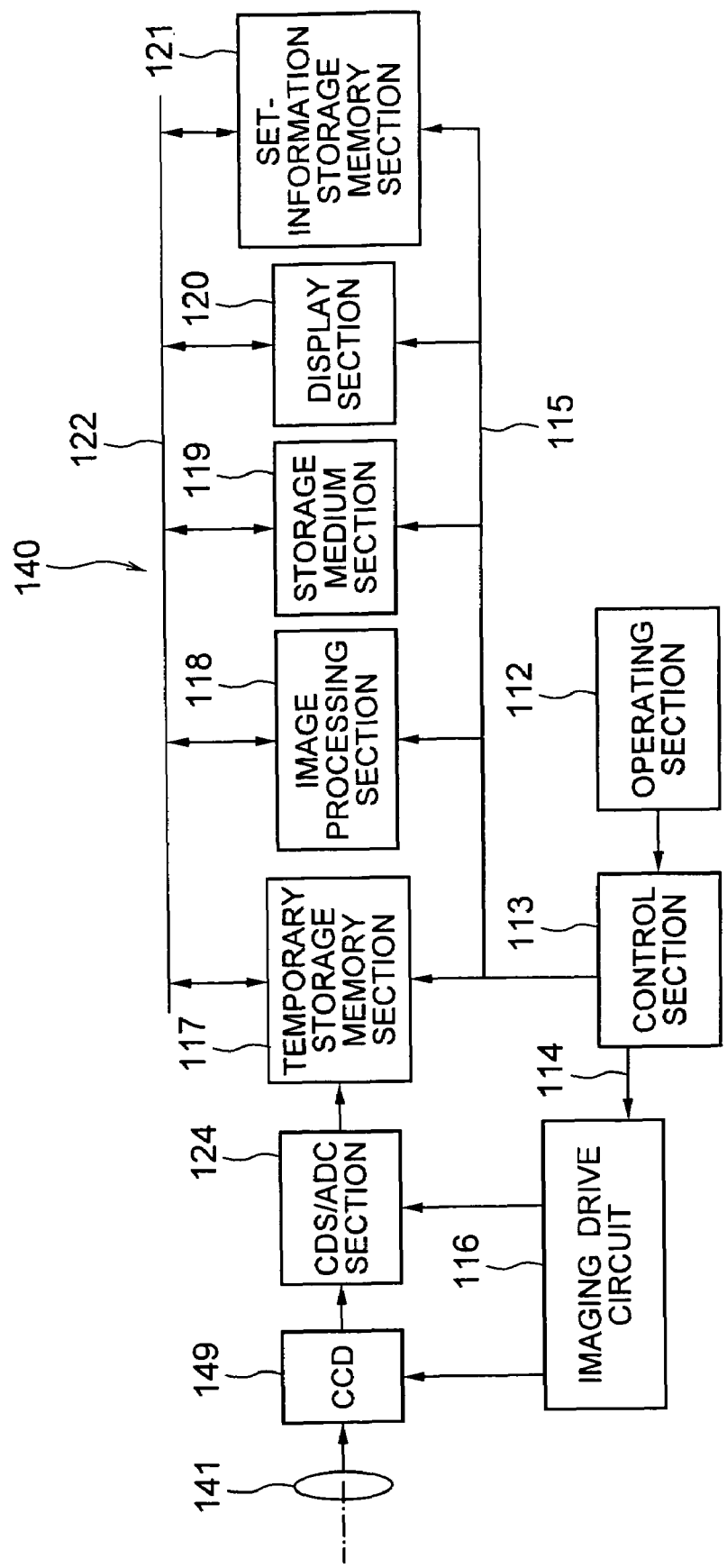
FIG. 15 is a structural block diagram of an internal circuit of main components of a digital camera.

FIG. 15 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 15, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the three-unit zoom lens system according to the present invention is useful as a zoom lens system which is advantageous for securing the zooming ratio and making the size small and light, and is useful for securing easily the optical performance.

It is possible to provide a zoom lens system which is advantageous for securing the zooming ratio, and making the size small and light, and which can easily secure the optical performance, and an image pickup apparatus which includes such zoom lens system.

What is claimed is:

1. A three-unit zoom lens system comprising in order from an object side thereof:
    a first lens unit having a negative refracting power;
    a second lens unit having a positive refracting power;
    a third lens unit having a negative refracting power; and
    an aperture stop which is at an image side of the first lens unit, and at the object side of a lens surface nearest to the image side of the second lens unit, and which moves integrally with the second lens unit, wherein
    at a time of zooming from a wide angle end to a telephoto end, a distance between the first lens unit and the second lens unit is narrowed, and a distance between the second lens unit and the third lens unit changes, and
    at the time of zooming from the wide angle end to the telephoto end, the first lens unit, after moving toward the image side at first, moves toward the object side,
    the second lens unit moves toward the object side at the time of zooming from the wide angle end to the telephoto end, and
    the third lens unit moves to be positioned at the object side at the telephoto end, with respect to the wide angle end, and
    the three-unit zoom lens system satisfies the following conditional expressions $$f_t/f_w > 3.8 \tag{1}$$

$$d_{G3}/f_w < 1.0 \tag{2}$$

where,
    $f_w$ denotes a focal length at the wide angle end, of the three-unit zoom lens system,
    $f_t$ denotes a focal length at the telephoto end, of the three-unit zoom lens system, and
    $d_{G3}$ denotes an optical axial thickness of the third lens unit.

2. The three-unit zoom lens system according to claim 1, wherein when the total number of lenses in the three-unit zoom lens system is indicated by N, the following conditional expression is satisfied $$5 \leq N \leq 8 \tag{7}.$$

3. The three-unit zoom lens system according to claim 1, wherein
    the second lens unit comprises a cemented lens of a positive lens and a negative lens, and
    an Abbe's number of the negative lens in the second lens unit is smaller than an Abbe's number of the positive lens in the second lens unit.

4. An image pickup apparatus comprising:
a three-unit zoom lens system; and
an image pickup element which is disposed at an image side of the three-unit zoom lens system, and which converts an optical image formed by the three-unit zoom lens system, to an electric signal, wherein
the three-unit zoom lens system is a zoom lens system according to claim 1.

5. The image pickup apparatus according to claim 4, comprising:
an image conversion section which converts the electric signal including a distortion due to the three-unit zoom lens system, to an image signal in which, the distortion is corrected by an image processing.

6. A three-unit zoom lens system comprising in order from an object side thereof:
a first lens unit having a negative refracting power;
a second lens unit having a positive refracting power;
a third lens unit having a negative refracting power; and
an aperture stop which is at an image side of the first lens unit, and at the object side of a lens surface nearest to the image side of the second lens unit, and which moves integrally with the second lens unit, wherein
at a time of zooming from a wide angle end to a telephoto end, a distance between the first lens unit and the second lens unit is narrowed, and a distance between the second lens unit and the third lens unit changes, and
the second lens unit moves toward the object side at the time of zooming from the wide angle end to the telephoto end, and
the third lens unit moves to be positioned at the object side at the telephoto end, with respect to the wide angle end, and the three-unit zoom lens system satisfies the following conditional expressions $$f_t/f_w > 3.8 \tag{1}$$

$$d_{G3}/f_w < 1.0 \tag{2}$$

where,
$f_w$ denotes a focal length at the wide angle end, of the three-unit zoom lens system,
$f_t$ denotes a focal length at the telephoto end, of the three-unit zoom lens system, and
$d_{G3}$ denotes an optical axial thickness of the third lens unit, and wherein the zoom lens system satisfies the following conditional expression $$3 < D_w/f_w < 8 \tag{3}$$

$$0.3 < D_t/f_t < 1.8 \tag{4}$$

where,
$D_w$ denotes an overall optical axial length at the wide angle end, of the three-unit zoom lens system,
$D_t$ denotes an overall optical axial length at the telephoto end, of the three-unit zoom lens system, and
the overall length is a length which is obtained by adding a back focus expressed in terms of an air conversion length, to an optical axial thickness from a surface of incidence of a lens nearest to the object up to a surface of emergence of a lens nearest to the image, of the three-unit zoom lens system.

7. A three-unit zoom lens system comprising in order from an object side thereof:
a first lens unit having a negative refracting power;
a second lens unit having a positive refracting power;
a third lens unit having a negative refracting power; and
an aperture stop which is at an image side of the first lens unit, and at the object side of a lens surface nearest to the image side of the second lens unit, and which moves integrally with the second lens unit, wherein
at a time of zooming from a wide angle end to a telephoto end, a distance between the first lens unit and the second lens unit is narrowed, and a distance between the second lens unit and the third lens unit changes, and
the second lens unit moves toward the object side at the time of zooming from the wide angle end to the telephoto end, and
the third lens unit moves to be positioned at the object side at the telephoto end, with respect to the wide angle end, and the three-unit zoom lens system satisfies the following conditional expressions $$f_t/f_w > 3.8 \tag{1}$$

$$d_{G3}/f_w < 1.0 \tag{2}$$

where,
$f_w$ denotes a focal length at the wide angle end, of the three-unit zoom lens system,
$f_t$ denotes a focal length at the telephoto end, of the three-unit zoom lens system, and
$d_{G3}$ denotes an optical axial thickness of the third lens unit, and wherein at the time of zooming from the wide angle end to the telephoto end, the second lens unit and the third lens unit satisfy the following conditional expression $$0.3 < \Delta_{G3}/\Delta_{G2} < 1.2 \tag{5}$$

where,
$\Delta_{G2}$ denotes an amount of change in a position at the telephoto end with respect to a position at the wide angle end of the second lens unit,
$\Delta_{G3}$ denotes an amount of change in a position at the telephoto end with respect to a position at the wide angle end of the third lens unit, and
a change at the object side is let to be a positive reference numeral.

8. A three-unit zoom lens system comprising in order from an object side thereof:
a first lens unit having a negative refracting power;
a second lens unit having a positive refracting power;
a third lens unit having a negative refracting power; and
an aperture stop which is at an image side of the first lens unit, and at the object side of a lens surface nearest to the image side of the second lens unit, and which moves integrally with the second lens unit, wherein
at a time of zooming from a wide angle end to a telephoto end, a distance between the first lens unit and the second lens unit is narrowed, and a distance between the second lens unit and the third lens unit changes, and
the second lens unit moves toward the object side at the time of zooming from the wide angle end to the telephoto end, and
the third lens unit moves to be positioned at the object side at the telephoto end, with respect to the wide angle end, and the three-unit zoom lens system satisfies the following conditional expressions $$f_t/f_w > 3.8 \tag{1}$$

$$d_{G3}/f_w < 1.0 \tag{2}$$

where,
$f_w$ denotes a focal length at the wide angle end, of the three-unit zoom lens system, $f_t$ denotes a focal length at the telephoto end, of the three-unit zoom lens system, and $d_{G3}$ denotes an optical axial thickness of the third lens unit, and wherein the first lens unit includes a negative lens which is disposed nearest to the object, and which satisfies the following conditional expression $$0.0 < (r_{L11} + r_{L12}) / (r_{L11} - r_{L12}) < 3.0 \tag{6}$$

where, $r_{L11}$ denotes a paraxial radius of curvature of a surface on the object side, of the negative lens nearest to the object, in the first lens unit, and $r_{L12}$ denotes a paraxial radius of curvature of a surface on the image side, of the negative lens nearest to the object, in the first lens unit.

9. A three-unit zoom lens system comprising in order from an object side thereof:
a first lens unit having a negative refracting power;
a second lens unit having a positive refracting power;
a third lens unit having a negative refracting power; and
an aperture stop which is at an image side of the first lens unit, and at the object side of a lens surface nearest to the image side of the second lens unit, and which moves integrally with the second lens unit, wherein
at a time of zooming from a wide angle end to a telephoto end, a distance between the first lens unit and the second lens unit is narrowed, and a distance between the second lens unit and the third lens unit changes, and
the second lens unit moves toward the object side at the time of zooming from the wide angle end to the telephoto end, and
the third lens unit moves to be positioned at the object side at the telephoto end, with respect to the wide angle end, and the three-unit zoom lens system satisfies the following conditional expressions $$f_t/f_w > 3.8 \tag{1}$$

$$d_{G3}/f_w < 1.0 \tag{2}$$

where, $f_w$ denotes a focal length at the wide angle end, of the three-unit zoom lens system, $f_t$ denotes a focal length at the telephoto end, of the three-unit zoom lens system, and $d_{G3}$ denotes an optical axial thickness of the third lens unit, and wherein the total number of lenses in the third lens unit is one.

10. A three-unit zoom lens system comprising in order from an object side thereof:
a first lens unit having a negative refracting power;
a second lens unit having a positive refracting power;
a third lens unit having a negative refracting power; and
an aperture stop which is at an image side of the first lens unit, and at the object side of a lens surface nearest to the image side of the second lens unit, and which moves integrally with the second lens unit, wherein
at a time of zooming from a wide angle end to a telephoto end, a distance between the first lens unit and the second lens unit is narrowed, and a distance between the second lens unit and the third lens unit changes, and
the second lens unit moves toward the object side at the time of zooming from the wide angle end to the telephoto end, and
the third lens unit moves to be positioned at the object side at the telephoto end, with respect to the wide angle end, and the three-unit zoom lens system satisfies the following conditional expressions $$f_t/f_w > 3.8 \tag{1}$$

$$d_{G3}/f_w < 1.0 \tag{2}$$

where, $f_w$ denotes a focal length at the wide angle end, of the three-unit zoom lens system, $f_t$ denotes a focal length at the telephoto end, of the three-unit zoom lens system, and $d_{G3}$ denotes an optical axial thickness of the third lens unit, and wherein the second lens unit having a lens surface nearest to the object and a lens surface nearest to the image, wherein both lens surfaces are aspheric surfaces.

11. An image pickup apparatus comprising:
a three-unit zoom lens system; and
an image pickup element which is disposed at an image side of the three-unit zoom lens system, and which converts an optical image formed by the three-unit zoom lens system, to an electric signal, wherein
the three-unit zoom lens system comprises in order from an object side thereof:
a first lens unit having a negative refracting power;
a second lens unit having a positive refracting power;
a third lens unit having a negative refracting power; and
an aperture stop which is at an image side of the first lens unit, and at the object side of a lens surface nearest to the image side of the second lens unit, and which moves integrally with the second lens unit, wherein
at a time of zooming from a wide angle end to a telephoto end, a distance between the first lens unit and the second lens unit is narrowed, and a distance between the second lens unit and the third lens unit changes, and
the second lens unit moves toward the object side at the time of zooming from the wide angle end to the telephoto end, and
the third lens unit moves to be positioned at the object side at the telephoto end, with respect to the wide angle end, and
the three-unit zoom lens system satisfies the following conditional expressions $$f_t/f_w > 3.8 \tag{1}$$

$$d_{G3}/f_w < 1.0 \tag{2}$$

where, $f_w$ denotes a focal length at the wide angle end, of the three-unit zoom lens system, $f_t$ denotes a focal length at the telephoto end, of the three-unit zoom lens system, and $d_{G3}$ denotes an optical axial thickness of the third lens unit, and wherein in a state at the wide angle end of the three-unit zoom lens system, an angle formed by an optical axis and a chief ray which is emerged from the three-unit zoom lens system directed toward a maximum image height of an effective image pickup area of the image pickup element satisfies the following conditional expressions $$-40° < EX(w) < -11° \tag{8}$$

where,

EX(w) denotes the angle formed by the optical axis and the chief ray which is emerged from the three-unit zoom lens system directed toward the maximum image height of the effective image pickup area of the image pickup element.

12. A three-unit zoom lens system comprising in order from an object side thereof:
- a first lens unit having a negative refracting power;
- a second lens unit having a positive refracting power;
- a third lens unit having a negative refracting power; and
- an aperture stop which is at an image side of the first lens unit, and at the object side of a lens surface nearest to the image side of the second lens unit, and which moves integrally with the second lens unit, wherein at the time of zooming from a wide angle end to a telephoto end, a distance between the first lens unit and the second lens unit is narrowed, and a distance between the second lens unit and the third lens unit changes, and the second lens unit moves toward the object side at the time of zooming from the wide angle end to the telephoto end, and the third lens unit moves to be positioned at the object side at the telephoto end, with respect to the wide angle end, and the three-unit zoom lens system satisfies the following conditional expressions $$3.8 < f_t/f_w < 5.5 \quad (21)$$

$$2.0 < \beta_2(t)/\beta_2(w) < 3.2 \quad (22)$$

$$1.2 < \beta_3(t)/\beta_3(w) < 1.8 \quad (23)$$

where, $f_t$ denotes a focal length at the wide angle end, of the three-unit zoom lens system, $f_w$ denotes a focal length at the telephoto end, of the three-unit zoom lens system, $\beta_2$ (w) denotes a lateral magnification of the second lens unit, at the wide angle end, $\beta_2$ (t) denotes a lateral magnification of the second lens unit, at the telephoto end, $\beta_3$ (w) denotes a lateral magnification of the third lens unit, at the wide angle end, and $\beta_3$ (t) denotes a lateral magnification of the third lens unit, at the telephoto end.

13. The three-unit zoom lens system according to claim 12, wherein the third lens unit comprises a negative lens component having a shape of a meniscus, which satisfies the following conditional expression $$-20 < (r_{L31} + r_{L32})/(r_{L31} - r_{L32}) < -1.0 \quad (24)$$

where, $r_{L31}$ denotes a paraxial radius of curvature of a surface on the object side, of the negative lens element in the third lens unit, and $r_{L32}$ denotes a paraxial radius of curvature of a surface on the image side, of the negative lens element in the third lens unit, and a lens component is a lens having only two surfaces namely a surface of incidence and a surface of emergence which make a contact with air in an area through which the light passes, and means a single lens or a cemented lens.

14. The three-unit zoom lens system according to claim 12, wherein the three-unit zoom lens system satisfies the following conditional expression $$3 < D_w/f_w < 8 \quad (25)$$

$$0.3 < D_t/f_t < 1.8 \quad (26)$$

where, $D_w$ denotes an overall optical axial length at the wide angle end, of the three-unit zoom lens system, $D_t$ denotes an overall optical axial length at the telephoto end, of the three-unit zoom lens system, and the overall length is a length which is obtained by adding a back focus expressed in terms of an air conversion length, to an optical axial thickness from a surface of incidence of a lens nearest to the object up to a surface of emergence of a lens nearest to the image, of the three-unit zoom lens system.

15. The three-unit zoom lens system according to claim 12, wherein at the time of zooming from the wide angle end to the telephoto end, the second lens unit and the third lens unit satisfy the following conditional expression $$0.3 < \Delta G_3/\Delta G_2 < 1.2 \quad (27)$$

where, $\Delta G_2$ denotes an amount of change in a position at the telephoto end with respect to a position at the wide angle end of the second lens unit, $\Delta G_3$ denotes an amount of change in a position at the telephoto end with respect to a position at the wide angle end of the third lens unit, and a change at the object side is let to be a positive reference numeral.

16. The three-unit zoom lens system according to claim 12, wherein the first lens unit comprises a negative lens which is disposed nearest to the object, and which satisfies the following conditional expression $$0.0 < (r_{L11} + r_{L12})/(r_{L11} - r_{L12}) < 3.0 \quad (28)$$

where, $r_{L11}$ denotes a paraxial radius of curvature of a surface on the object side, of the negative lens nearest to the object, in the first lens unit, and $r_{L12}$ denotes a paraxial radius of curvature of a surface on the image side, of the negative lens nearest to the object, in the first lens unit.

17. The three-unit zoom lens system according to claim 12, wherein when the total number of lenses in the three-unit zoom lens system is indicated by N, the following conditional expression is satisfied $$5 \leq N \leq 8 \quad (29).$$

18. The three-unit zoom lens system according to claim 12, wherein the second lens unit comprises a cemented lens of a positive lens and a negative lens, and an Abbe's number of the negative lens in the second lens unit is smaller than an Abbe's number of the positive lens in the second lens unit.

19. The three-unit zoom lens system according to claim 12, wherein the total number of lenses in the third lens unit is one.

20. The three-unit zoom lens system according to claim 12, wherein the second lens unit having a lens surface nearest to the object and a lens surface nearest to the image, wherein both lens surfaces in the second lens unit are aspheric surfaces.

21. An image pickup apparatus comprising:
- a three-unit zoom lens system; and
- an image pickup element which is disposed at an image side of the three-unit zoom lens system, and which converts an optical image formed by the three-unit zoom lens system, to an electric signal, wherein the three-unit zoom lens system is a zoom lens system according to claim 12.

22. The image pickup apparatus according to claim 21, comprising:
an image conversion section which converts the electric signal including a distortion due to the three-unit zoom lens system, to an image signal in which, the distortion is corrected by an image processing.

23. The image pickup apparatus according to claim 21, wherein
in a state at the wide angle end of the three-unit zoom lens system, an angle formed by an optical axis and a chief ray which is emerged from the three-unit zoom lens system directed toward a maximum image height of an effective image pickup area of the image pickup element satisfies the following conditional expression $$-40° < EX(w) < -11° \tag{10}$$

where,

EX(w) denotes the angle formed by the optical axis and the chief ray which is emerged from the three-unit zoom lens system directed toward the maximum image height of the effective image pickup area of the image pickup element.

* * * * *

UNITED STATES PATENT AND TRADEMARK OFFICE
CERTIFICATE OF CORRECTION

| | | |
|---|---|---|
| PATENT NO. | : 7,652,826 B2 | Page 1 of 1 |
| APPLICATION NO. | : 12/217870 | |
| DATED | : January 26, 2010 | |
| INVENTOR(S) | : M. Katakura | |

It is certified that error appears in the above-identified patent and that said Letters Patent is hereby corrected as shown below:

Title Page, Item [*] Notice:
The phrase "by 0 days" shall reflect as such appears on Letters Patent.

Column 36, line 57, change "both lens surfaces in the second lens unit are aspheric sur-" to -- both lens surfaces are aspheric sur- --.

Signed and Sealed this
Eleventh Day of January, 2011

David J. Kappos
*Director of the United States Patent and Trademark Office*